US012803200B2

(12) United States Patent
Lim

(10) Patent No.: US 12,803,200 B2
(45) Date of Patent: Nov. 17, 2026

(54) ELECTRICAL CONNECTOR WITH COVER INTEGRATED LOCKING SUPPORT

(71) Applicant: Molex, LLC, Lisle, IL (US)

(72) Inventor: Chen Yew Lim, Bukit Batok (SG)

(73) Assignee: Molex, LLC, Lisle, IL (US)

( * ) Notice: Subject to any disclaimer, the term of this patent is extended or adjusted under 35 U.S.C. 154(b) by 334 days.

(21) Appl. No.: 18/379,203

(22) Filed: Oct. 12, 2023

(65) Prior Publication Data

US 2024/0128669 A1 Apr. 18, 2024

(30) Foreign Application Priority Data

Oct. 12, 2022 (CN) ......................... 202211247320.8

(51) Int. Cl.

| | |
|---|---|
| ***H01R 12/79*** | (2011.01) |
| ***H01R 12/71*** | (2011.01) |
| ***H01R 13/506*** | (2006.01) |
| ***H01R 13/627*** | (2006.01) |
| ***H01R 13/633*** | (2006.01) |
| ***H01R 13/6582*** | (2011.01) |

(52) U.S. Cl.

CPC ........... *H01R 12/79* (2013.01); *H01R 12/716* (2013.01); *H01R 13/506* (2013.01); *H01R 13/6275* (2013.01); *H01R 13/6335* (2013.01); *H01R 13/6582* (2013.01)

(58) Field of Classification Search

None

See application file for complete search history.

(56) References Cited

U.S. PATENT DOCUMENTS

| | | | | |
|---|---|---|---|---|
| 11,011,873 | B2 | 5/2021 | Peloza et al. | |
| 11,205,877 | B2 | 12/2021 | Diaz et al. | |
| 2005/0233631 | A1 * | 10/2005 | Wu | H01R 13/6275 439/352 |
| 2007/0054547 | A1 | 3/2007 | Ohtaka et al. | |

(Continued)

FOREIGN PATENT DOCUMENTS

| | | | |
|---|---|---|---|
| CN | 215343195 | U | 12/2021 |
| CN | 216529642 | U | 5/2022 |

(Continued)

*Primary Examiner* — Oscar C Jimenez

(57) ABSTRACT

An electrical connection device includes a wire-end connector. The wire-end connector includes an insulative housing, a plurality of terminals, a plurality of cables, a locking member and a cover body. The insulative housing is formed with a retaining groove. The plurality of terminals are provided to the insulative housing. The plurality of cables are electrically connected to the plurality of the terminals. The locking member has a retaining segment which is provided to the retaining groove, a locking segment which extends from the retaining segment and is spaced apart from the insulative housing and a connecting segment which extends from the locking segment. The cover body is provided to the insulative housing and has at least one stopping portion, the stopping portion stops a surface of the connecting segment opposite to the insulative housing so as to prevent excessive deformation of the connecting segment. By the manner that the stopping portion is formed to the cover body, manufacturing convenience can be promoted and manufacturing cost can be lowered.

25 Claims, 20 Drawing Sheets

(56) References Cited

U.S. PATENT DOCUMENTS

| | | | | |
|---|---|---|---|---|
| 2020/0194932 | A1* | 6/2020 | Henry | H01R 13/516 |
| 2021/0075143 | A1 | 3/2021 | Laurx et al. | |
| 2022/0021157 | A1* | 1/2022 | Sun | H01R 13/631 |
| 2022/0029360 | A1* | 1/2022 | Little | H01R 13/405 |
| 2022/0200208 | A1* | 6/2022 | Tseng | H01R 13/631 |
| 2022/0368077 | A1* | 11/2022 | Little | H01R 4/023 |

FOREIGN PATENT DOCUMENTS

| | | | |
|---|---|---|---|
| TW | M613035 | U | 6/2021 |
| WO | 2022147292 | A1 | 7/2022 |

* cited by examiner

ELECTRICAL CONNECTOR WITH COVER INTEGRATED LOCKING SUPPORT

RELATED APPLICATION

The present application claims priority to Chinese Patent Application No. 202211247320.8 filed on Oct. 12, 2022, which is incorporated by reference in its entirety.

TECHNICAL FIELD

The present disclosure relates to an electrical connection device, and particularly relates to an electrical connection device which has a locking and locking release structure.

BACKGROUND

Chinese patent document CN216529642U discloses a cable connector which includes a plastic main body, an electrical contact body, a cable, a pull strap and a connector locking member. The plastic main body includes a front housing and a rear housing which are assembled with each other. The front housing is provided thereon with a mounting portion which is used to mount the connector locking member. The mounting portion includes a bottom surface, two side surfaces and position-limiting blocks which are respectively positioned above rear portions of the two side surfaces. A fixing portion of the connector locking member is positioned on the bottom surface, so that a first elastic piece is positioned to be provided in a first recessed groove of the bottom surface. An upper surface of a pressing portion of the connector locking member is positioned below the position-limiting blocks.

The front housing and the rear housing of the plastic main body is made by integrally forming with for example injection molding manner, structure complexity of the plastic components usually has greatly effect on manufacture difficulty, manufacturing time and manufacturing cost. The manner that the position-limiting blocks are formed above the two side surfaces of the front housing and are respectively positioned to tips of the two side surfaces of the front housing makes the entire structure of the front housing complex, thereby resulting in that manufacturing of the front housing is more difficult, is long in time and is high in cost.

SUMMARY

Therefore, one of objects of the present disclosure is to provide an electrical connection device which can overcome at least one deficiency in the prior art.

Accordingly, an electrical connection device of the present disclosure comprises a wire-end connector. The wire-end connector comprises an insulative housing, a plurality of terminals, a plurality of cables, a locking member and a cover body. The insulative housing is formed with a retaining groove. The plurality of terminals are provided to the insulative housing. The plurality of cables are electrically connected to the plurality of the terminals. The locking member has a retaining segment which is provided to the retaining groove, a locking segment which extends from the retaining segment and is spaced apart from the insulative housing and a connecting segment which extends from the locking segment. The cover body is provided to the insulative housing and has at least one stopping portion, the stopping portion stops a surface of the connecting segment opposite to the insulative housing so as to prevent excessive deformation of the connecting segment.

In some embodiments, the cover body is formed with an aperture, the wire-end connector further comprises a pull strap, the pull strap has a connecting strap body which passes through the aperture and is connected to the connecting segment and a grasping strap body.

In some embodiments, the aperture has an aperture portion and a recessed groove portion, the aperture portion penetrates the cover body and allows the connecting strap body to pass therethrough, the recessed groove portion is recessed upwardly from a bottom surface of the cover body and is communicated with the aperture portion, the recessed groove portion allows a top portion of the connecting segment and a part of the connecting strap body to be received therein.

In some embodiments, the stopping portion is a stop protruding block.

In some embodiments, the cover body has the two stopping portions which are spaced apart from each other and stop the surface of the connecting segment.

In some embodiments, the locking segment has a protruding portion, the electrical connection device further comprises a board-end connector which is used to mate with the wire-end connector, the board-end connector comprises an insulative seat, a plurality of terminals which are provided to the insulative seat and a metal outer shell which sheathes the insulative seat, the metal outer shell is formed with a latching hole which is used to allow the protruding portion to latch therewith, an inner side of the metal outer shell has a chamfer which is closely adjacent to a top portion of the latching hole and is toward the protruding portion.

In some embodiments, the insulative housing has two side protruding blocks which are respectively positioned to opposite sides of the insulative housing, the electrical connection device further comprises a board-end connector which is used to mate with the wire-end connector, the board-end connector comprises an insulative seat, a plurality of terminals which are provided to the insulative seat and a metal outer shell which sheathes the insulative seat, the metal outer shell has two elastic latching arms which are respectively used to latch to the two side protruding blocks.

In some embodiments, each elastic latching arm has an elastic arm body and a latching arm body, the elastic arm body is a trapezoidal piece and has a root portion and an end portion opposite to the root portion, the end portion and the root portion are parallel to each other, a width of the end portion is less than a width of the root portion, the latching arm body is connected to the end portion and is used to latch to the corresponding side protruding block.

In some embodiments, the trapezoidal piece is an isosceles trapezoidal piece.

In some embodiments, a width of the latching arm body is larger than the width of the end portion.

In some embodiments, the latching arm body has a body portion which is connected to the end portion and two wing portions which are respectively formed to opposite ends of the body portion, the two wing portions respectively protrude relative to opposite ends of the end portion.

In some embodiments, each elastic latching arm has an elastic arm body and a latching arm body, the elastic arm body has an end portion, the latching arm body is connected to the end portion and is used to latch to the corresponding side protruding block, a width of the latching arm body is larger than a width of the end portion.

In some embodiments, the latching arm body has two wing portions which respectively protrude relative to opposite ends of the end portion.

In some embodiments, the insulative housing has a main body portion and four outer protruding blocks, the main body portion is rectangular frame-shaped and has four outer corners, the four outer protruding blocks respectively protrude outwardly from the four outer corners, the electrical connection device further comprises a board-end connector which is used to mate with the wire-end connector, the board-end connector comprises an insulative seat, a plurality of terminals which are provided to the insulative seat and a metal outer shell which sheathes the insulative seat, the metal outer shell is rectangular frame-shaped and is used to allow the main body portion to insert therein, the metal outer shell has four inner corner surfaces, the four outer protruding blocks are respectively used to be closely adjacent to the four inner corner surfaces.

In some embodiments, each outer protruding block has an outer corner surface, the outer corner surface has two outer surface portions which are perpendicular to each other.

In some embodiments, the electrical connection device further comprises a board-end connector which is used to mate with the wire-end connector, the board-end connector comprises an insulative seat, a plurality of terminals which are provided to the insulative seat and a metal outer shell which sheathes the insulative seat, the insulative seat is rectangular frame-shaped and has four inner corners and four inner protruding blocks which respectively protrude inwardly from the four inner corners, the insulative housing has a main body portion and a mating portion, the main body portion has an end surface, the mating portion extends from the end surface, is rectangular frame-shaped, and is used to insert into the insulative seat, the mating portion has four outer corner surfaces, each outer corner surface at least has a part which is used to be closely adjacent to the corresponding inner protruding block.

In some embodiments, each inner protruding block has a guiding oblique surface which is used to guide insertion of the mating portion and an inner corner surface which is used to be closely adjacent to the corresponding outer corner surface.

In some embodiments, the inner corner surface has two inner surface portions which are perpendicular to each other.

In some embodiments, the insulative seat further has an outer circumferential wall and an inner circumferential wall which is formed to an inner wall surface of the outer circumferential wall and is used to stop the wire-end connector, the outer circumferential wall has the four inner corners, the four inner protruding blocks and a top surface, the inner corner surface is connected to the inner circumferential wall, the guiding oblique surface is spaced apart from the top surface by a certain distance.

In some embodiments, the wire-end connector further comprises two strengthening ribs which are fixedly engaged to the insulative housing and are spaced apart from each other.

In some embodiments, the wire-end connector further comprises at least one terminal wafer group, the terminal wafer group comprises a terminal array, an insulative member and a ground shielding member, the terminal array has the plurality of terminals, the plurality of terminals are divided into signal terminals and ground terminals, the insulative member covers and supports one part of each signal terminal and one part of each ground terminal of the terminal wafer group and exposes the other part of each signal terminal and the other part of each ground terminal of the terminal wafer group, the ground shielding member is provided to an end of the insulative member and comprises protrusion portions, each protrusion portion passes through the insulative member and is electrically connected to the corresponding ground terminal, the electrical connection device further comprises a board-end connector which is used to mate with the wire-end connector, the board-end connector comprises at least one terminal wafer module, the terminal wafer module comprises a terminal array, an insulative member and a ground piece, the terminal array of the terminal wafer module is used to be electrically connected to the terminal array of the terminal wafer group and has signal terminals and ground terminals, the insulative member of the terminal wafer module covers and supports one part of each signal terminal and one part of each ground terminal of the terminal wafer module and exposes the other part of each signal terminal and the other part of each ground terminal of the terminal wafer module, the ground piece has protruding piece portions which are electrically connected to the ground terminals of the terminal wafer module respectively.

In some embodiments, each ground terminal of the terminal wafer group is formed with a ground hole, the ground shielding member comprises a protrusion plate which has the protrusion portions and a middle plate, the protrusion plate has a plate portion, the protrusion portions are integrally connected to the plate portion, the middle plate is provided between the insulative member of the terminal wafer group and the plate portion of the protrusion plate and is formed with penetrating holes, each protrusion portion passes through the corresponding ground hole and the corresponding penetrating hole.

In some embodiments, each ground terminal of the terminal wafer module is formed with a ground hole, the ground piece further has a main piece portion which is provided to the insulative member of the terminal wafer module, the protruding piece portions protrude from an end of the main piece portion, each protruding piece portion passes through the ground hole of the corresponding ground terminal of the terminal wafer module.

In some embodiments, the wire-end connector comprises two terminal wafer groups, the board-end connector comprises two terminal wafer modules, the terminal array of each terminal wafer module is used to be electrically connected to the terminal array of the corresponding terminal wafer group.

In some embodiments, the plurality of the cables are divided into a plurality of first cables and a plurality of second cables, the wire-end connector further comprises a first transmitting unit, a second transmitting unit and a bracket, the first transmitting unit comprises a first terminal wafer group and the plurality of first cables which are connected to the first terminal wafer group, the second transmitting unit comprises a second terminal wafer group and the plurality of the second cables which are connected to the second terminal wafer group, the second terminal wafer group is positioned behind the first terminal wafer group, is positioned below the plurality of first cables, and supports the plurality of first cables, the bracket is positioned between the first terminal wafer group and the second terminal wafer group, is positioned below the plurality of the first cables, and supports the plurality of the first cables.

The present disclosure at least has following effect: by that the stopping portion of the cover body stops the connecting segment, excessive deformation of the connecting segment can be prevented. Because the cover body is simple in structure thereof, is easily manufactured, manufacturing time is short, and the cost is low, by the manner that the stopping portion is formed to the cover body, manufacturing convenience can be promoted and manufacturing cost can be lowered.

BRIEF DESCRIPTION OF THE DRAWINGS

Other features and effects of the present disclosure will be apparent in embodiments referring to the accompanying drawings, in which.

DETAILED DESCRIPTION

Figure 1:
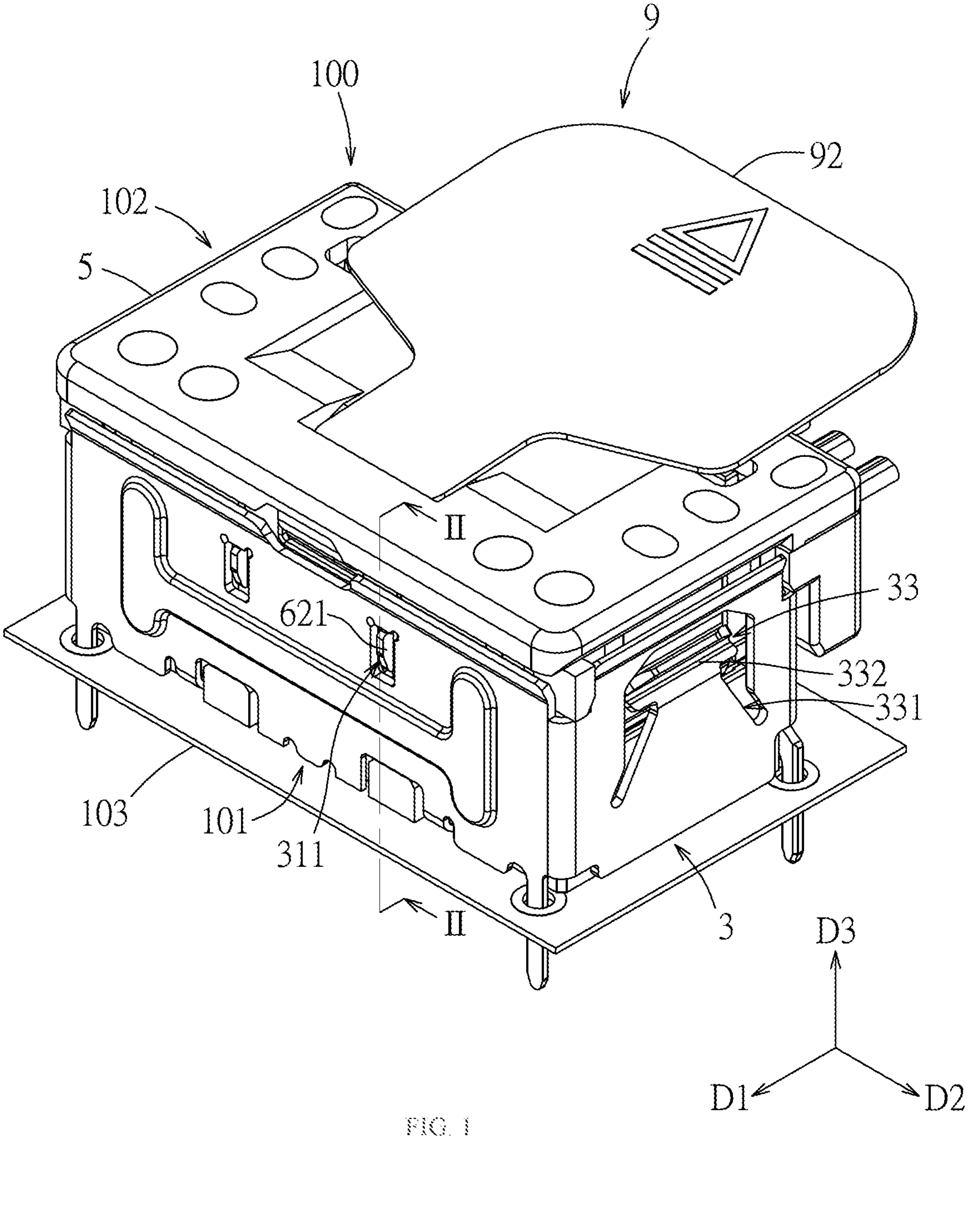
FIG. 1 is a perspective view of an embodiment of an electrical connection device of the present disclosure provided to a circuit board.

Before the present disclosure is described in detail, it is noted that the similar elements are indicated by the same reference numerals in the following description.

Figure 2:
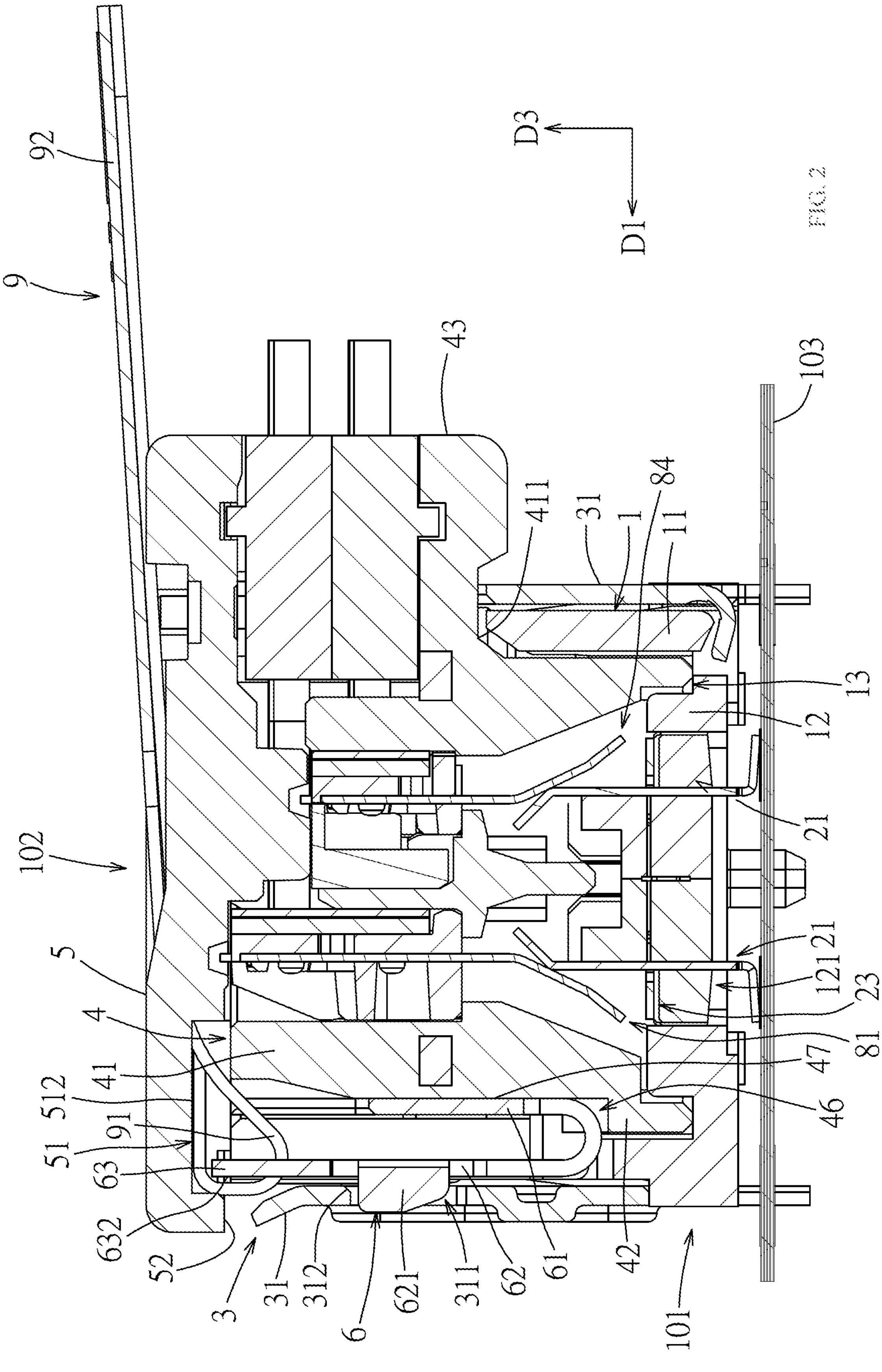
FIG. 2 is a cross sectional view taken along a line II-II of FIG. 1.

Referring to FIG. 1 and FIG. 2, an embodiment of an electrical connection device 100 of the present disclosure includes a board-end connector 101 and a wire-end connector 102. The board-end connector 101 is provided to a circuit board 103 and is electrically connected with the circuit board 103. The wire-end connector 102 is used to mate with the board-end connector 101.

For sake of the later description, in the electrical connection device 100, a first direction D1, a second direction D2 which is perpendicular to the first direction D1 and a third direction D3 which is perpendicular to the first direction D1 and the second direction D2 are defined. In the present embodiment, the first direction D1 takes a front-rear direction as an example, a direction to which an arrow of FIG. 1 points is front and a direction opposite to front is rear; the second direction D2 takes a left-right direction as an example, a direction to which an arrow of FIG. 1 points is left and a direction opposite to left is right; and the third direction D3 takes an up-down direction as an example, a direction to which an arrow of FIG. 1 points is up and a direction opposite to up is down.

Referring to FIG. 3, FIG. 4, FIG. 5 and FIG. 6, the board-end connector 101 includes an insulative seat 1, a transmitting assembly 2 and a metal outer shell 3. The insulative seat 1 is provided on the circuit board 103. The insulative seat 1 is rectangular frame-shaped and a length direction of the insulative seat 1 extends along the second direction D2. The insulative seat 1 has an outer circumferential wall 11 and an inner circumferential wall 12 which is formed to an inner wall surface of the outer circumferential wall 11. The outer circumferential wall 11 has a bottom surface 111, a top surface 112, four inner corners 113 and four inner protruding blocks 114. The bottom surface 111 faces the circuit board 103 and is flush with a bottom surface of the inner circumferential wall 12. The top surface 112 is spaced apart from the bottom surface 111 along the third direction D3. The four inner corners 113 are formed between the inner circumferential wall 12 and the top surface 112. The four inner protruding blocks 114 respectively protrude inwardly from the four inner corners 113. Each inner protruding block 114 has an inner corner surface 115 and a guiding oblique surface 116. The inner corner surface 115 is a vertical surface which is connected to the inner circumferential wall 12. The inner corner surface 115 has two inner surface portions 117 which are perpendicular to each other, the two inner surface portions 117 are respectively parallel to the first direction D1 and the second direction D2. The guiding oblique surface 116 obliquely extends upwardly from a top end of the inner corner surface 115 toward the corresponding inner corner 113. The guiding oblique surface 116 is spaced apart from the top surface 112 along the third direction D3 by a certain distance. The inner circumferential wall 12 is used to stop the wire-end connector 102 and defines an opening 121 which is used to allow the transmitting assembly 2 to be received therein and a plurality of snapping grooves 122. One part of the plurality of snapping grooves 122 are spaced apart from each other along the second direction D2 and are communicated with a front end of the opening 121. The other part of the plurality of snapping grooves 122 are spaced apart from each other along the second direction D2 and are communicated with a rear end of the opening 121. The inner circumferential wall 12 and the outer circumferential wall 11 together define an inserting groove 13 which encircles an outer circumference of the opening 121 and is used to allow the wire-end connector 102 to insert therein.

Referring to FIG. 2, FIG. 4, FIG. 5 and FIG. 7, the transmitting assembly 2 is provided to the opening 121 of the insulative seat 1 and is fixedly engaged to the inner circumferential wall 12. The transmitting assembly 2 has two terminal wafer modules 20 which are reversely provided along the first direction D1. Because the two terminal wafer modules 20 are the same in structure, hereinafter only a specific structure of the terminal wafer module 20 which is positioned to the front will be described.

The terminal wafer module 20 includes a terminal array 21, an insulative member 22 and a ground piece 23. The terminal array 21 has a plurality of signal terminals 211, a plurality of ground terminals 212 and aground connecting piece 213. Every two signal terminals 211 which are adjacent to each other along the second direction D2 together constitutes a terminal pair. A bottom end of each signal terminal 211 is fixed to the circuit board 103 by for example soldering and is electrically connected with the circuit board 103. Every two ground terminals 212 which are adjacent to each other along the second direction D2 are respectively positioned to opposite sides of one corresponding pair of signal terminals 211. A bottom end of each ground terminal 212 is fixed to the circuit board 103 by for example soldering and is electrically connected with the circuit board 103. Each ground terminal 212 is formed with a ground hole 214. The ground connecting piece 213 is connected to top ends of the plurality of ground terminals 212.

The insulative member 22 has a bracket 221, a plurality of first snapping blocks 222 and a plurality of second snapping blocks 223. The bracket 221 extends along the second direction D2. The bracket 221 covers and supports one part of each signal terminal 211 and one part of each ground terminal 212 and exposes the other part of each signal terminal 211 and the other part of each ground terminal 212. A rear end of the bracket 221 is recessed to be formed with a plurality of snapping grooves 224 which are arranged along the second direction D2 and are spaced apart from each other. The plurality of first snapping blocks 222 protrude from the rear end of the bracket 221, are arranged along the second direction D2 and are spaced apart from each other. Each first snapping block 222 snaps to the corresponding snapping groove 224 of the insulative member 22 of the other terminal wafer module 20, so that the two insulative members 22 of the two terminal wafer modules 20 are capable of snapping with each other and being fixed together. The plurality of second snapping blocks 223 protrude from a front end of the bracket 221, are arranged along the second direction D2 and are spaced apart from each other. Each second snapping block 223 snaps to the corresponding snapping groove 122 of the insulative seat 1, so that the insulative member 22 is capable of snapping to and being fixed to the insulative seat 1.

The ground piece 23 has a main piece portion 231 and a plurality of protruding piece portions 232. The main piece portion 231 is long-piece shaped and a length direction of the main piece portion 231 extends along the second direction D2, and the main piece portion 231 is provided on the bracket 221 of the insulative member 22. The plurality of protruding piece portions 232 protrude from a rear end of the main piece portion 231, are arranged along the second direction D2 and are spaced apart from each other. Each protruding piece portion 232 passes through the ground hole 214 of the corresponding ground terminal 212 and is electrically connected with the corresponding ground terminal 212.

Figure 3:
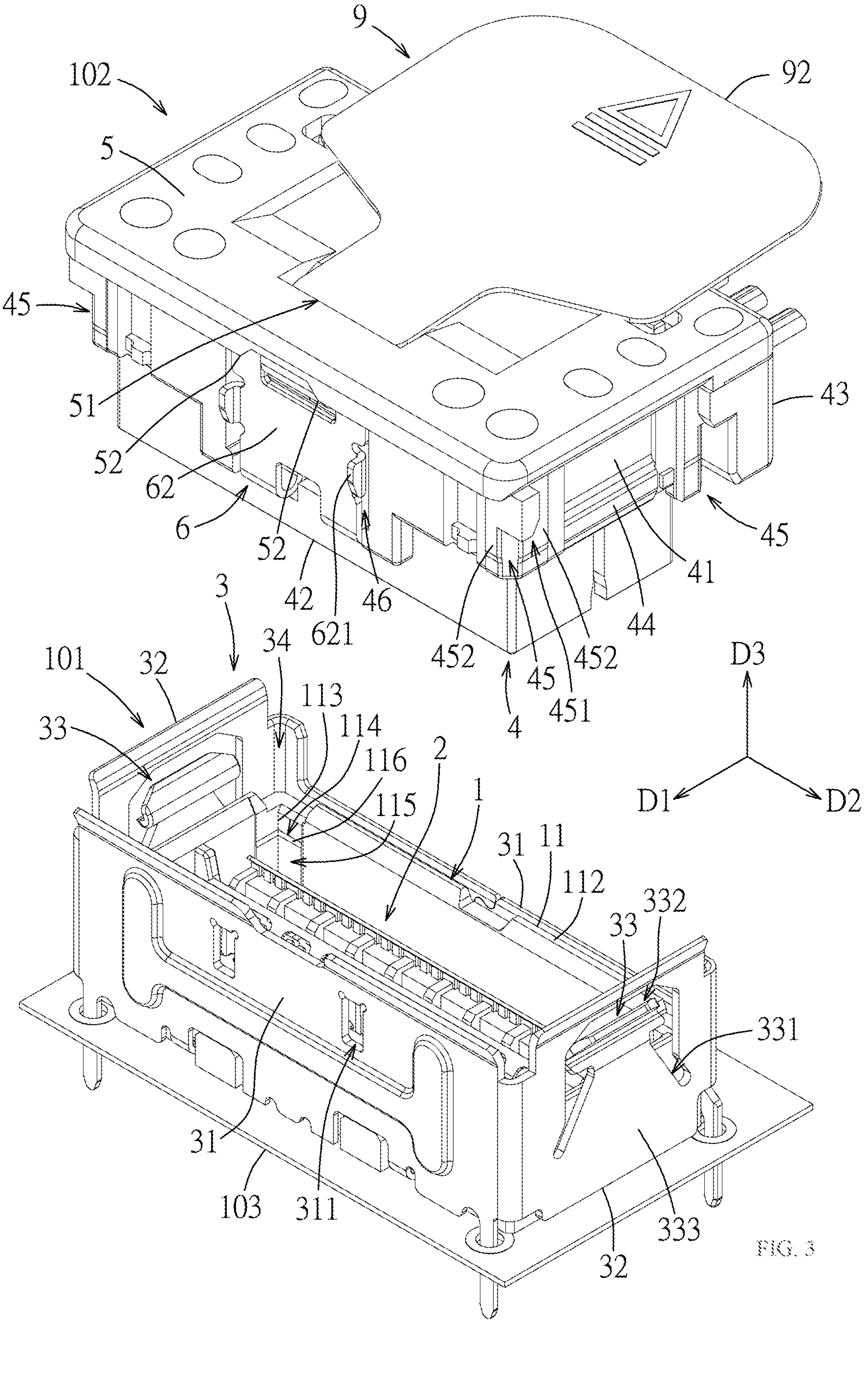
FIG. 3 is a perspective exploded view of the embodiment and the circuit board illustrating an assembling relationship among the circuit board, a board-end connector and a wire-end connector.
Figure 5:
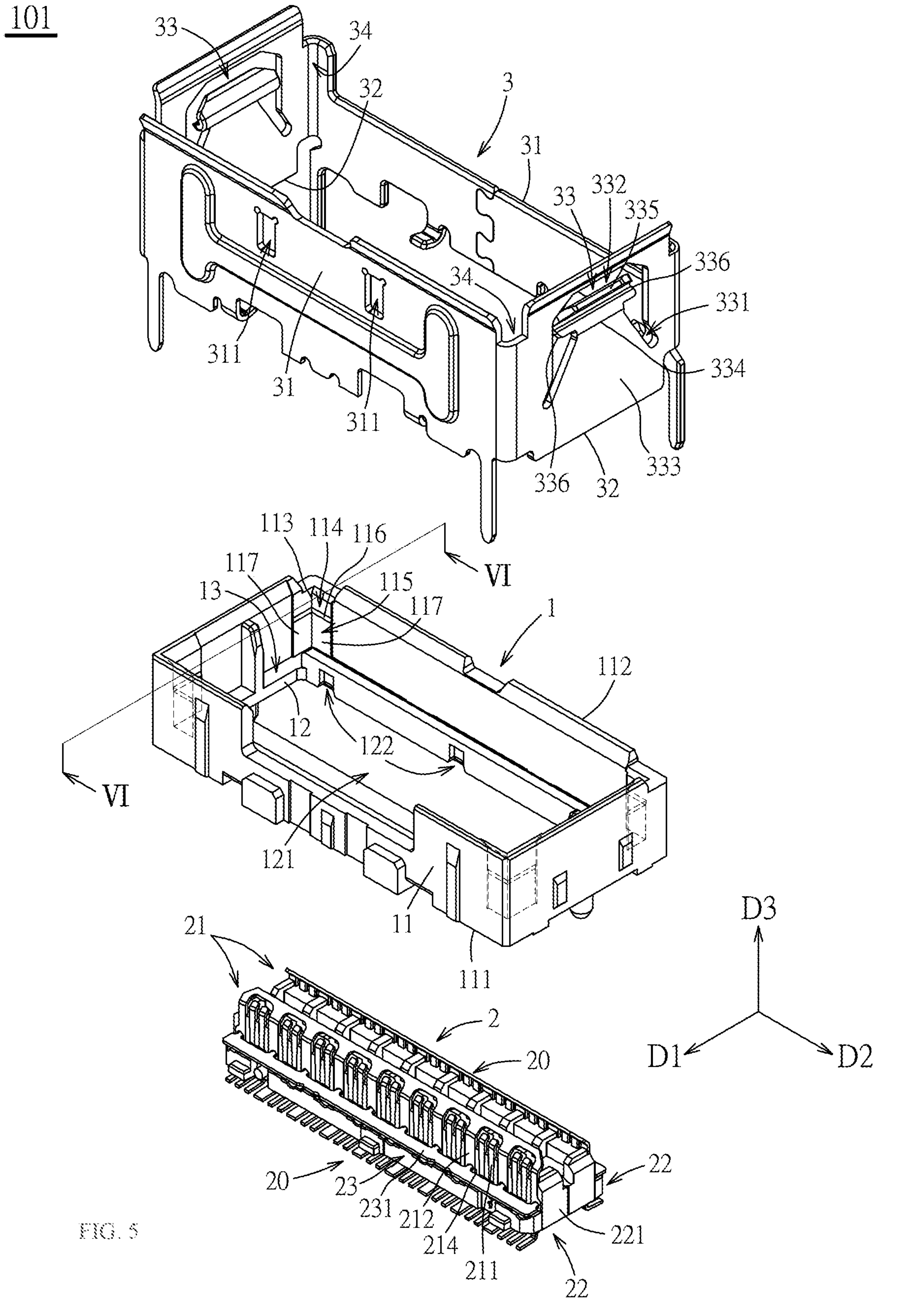
FIG. 5 is a perspective exploded view of the board-end connector of the embodiment illustrating an assembling relationship among an insulative seat, a transmitting assembly and a metal outer shell.

Referring to FIG. 2, FIG. 3 and FIG. 5, the metal outer shell 3 is provided to the circuit board 103 and sheathes the insulative seat 1. The metal outer shell 3 is rectangular frame-shaped and a length direction of the metal outer shell 3 extends along the second direction D2. The metal outer shell 3 is formed by for example processing, such as stamping and bending, a metal plate. The metal outer shell 3 has two end walls 31, two side walls 32 and two elastic latching arms 33. The two end walls 31 are spaced apart from each other along the first direction D1 and respectively are two long sides of the metal outer shell 3. A height of the end wall 31 which is positioned to a front end of the metal outer shell 3 is higher than a height of the end wall 31 which is positioned to a rear end of the metal outer shell 3. The end wall 31 which is positioned to the front end of the metal outer shell 3 is formed with two latching holes 311 which are spaced apart from each other along the second direction D2. Each latching hole 311 is long-hole shaped and a height of each latching hole 311 is higher than a height of the top surface 112 of the insulative seat 1. An inner side of the end wall 31 which is positioned to the front end of the metal outer shell 3 has two chamfers 312 which are respectively closely adjacent to top portions of the two latching holes 311 (FIG. 2 only illustrates one of the two chamfers 312), each chamfer 312 is toward the rear and the down.

Figure 4:
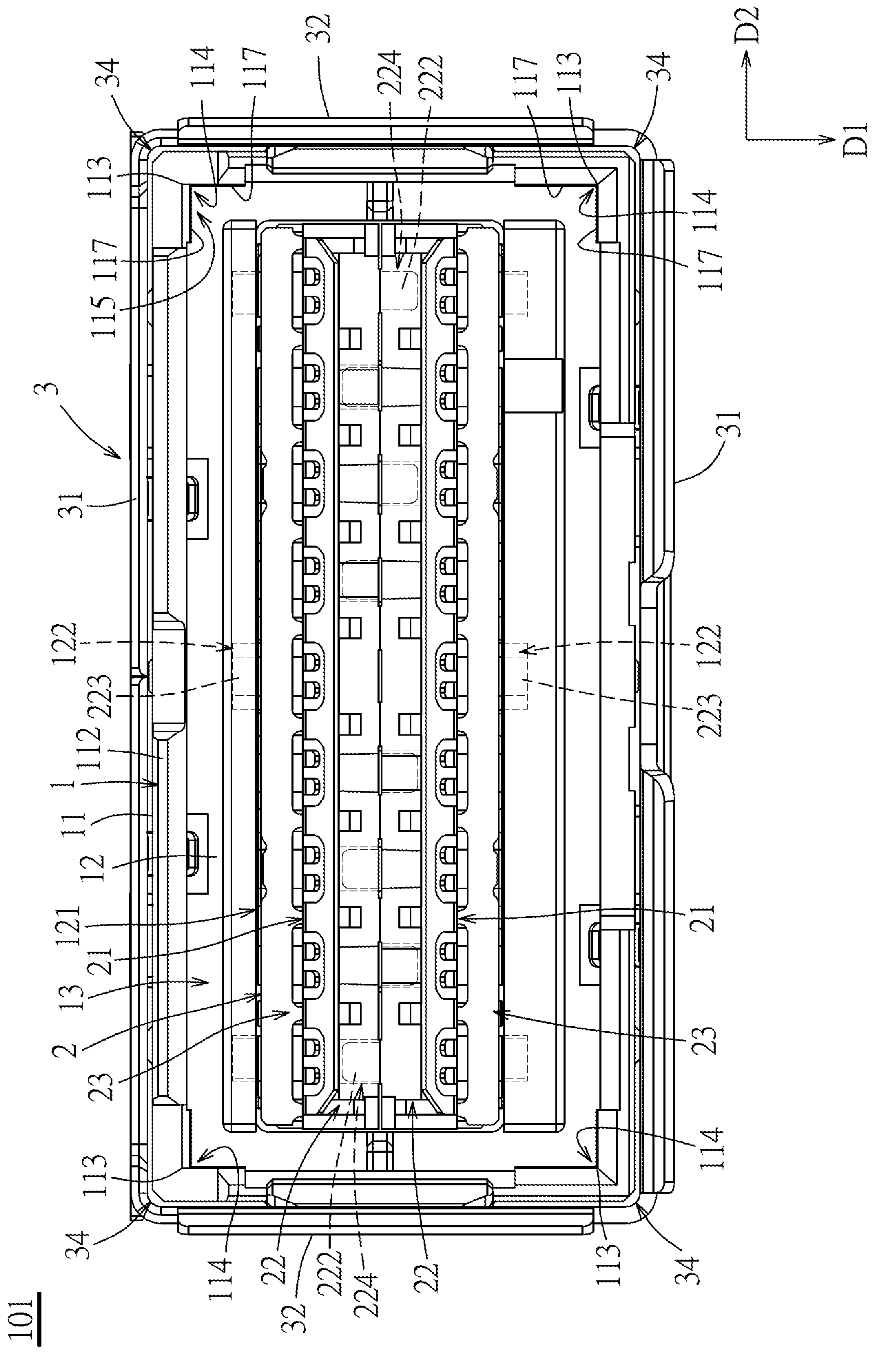
FIG. 4 is a top view of the board-end connector of the embodiment.

Referring to FIG. 3, FIG. 4 and FIG. 5, the two side walls 32 are spaced apart from each other along the second direction D2, are connected between the two end walls 31 and respectively are two short sides of the metal outer shell 3. The metal outer shell 3 further has four inner corner surfaces 34. The four inner corner surfaces 34 are defined together by the two end walls 31 and the two side walls 32 and partially protrude relative to the top surface 112 of the insulative seat 1.

Figure 8:
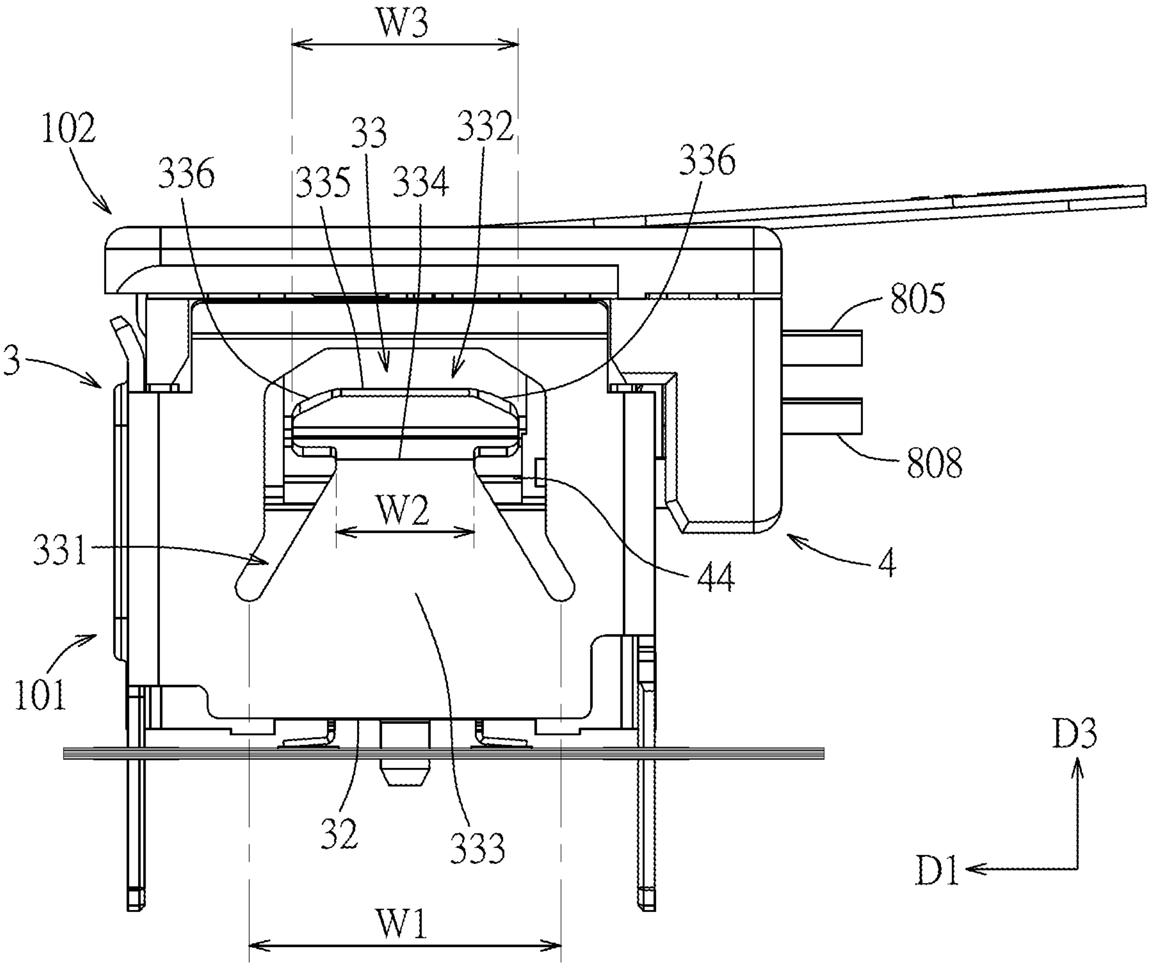
FIG. 8 is a side view of the embodiment and the circuit board.
Figure 9:
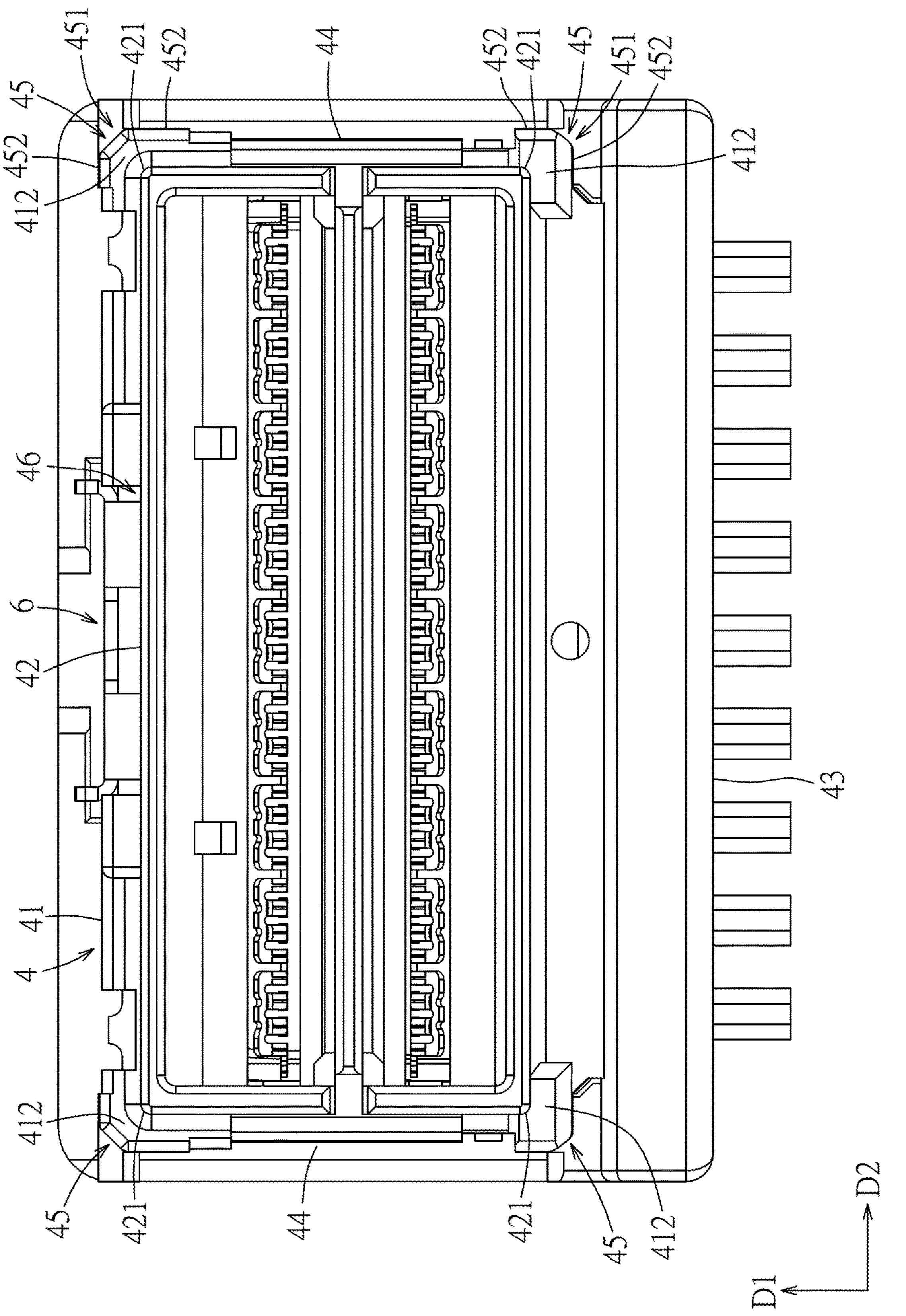
FIG. 9 is an incomplete bottom view of the embodiment of the wire-end connector with a pull strap omitted.

Referring to FIG. 3, FIG. 5 and FIG. 8, each elastic latching arm 33 has an elastic arm body 331 and a latching arm body 332. The elastic arm body 331 is a trapezoidal piece and has a root portion 333 and an end portion 334 which is opposite to the root portion 333 and is positioned above the root portion 333. The end portion 334 and the root portion 333 are parallel to each other and both the end portion 334 and the root portion 333 are parallel to the first direction D1. The root portion 333 is integrally connected to the corresponding side wall 32 and has a width W1 taken along the first direction D1. The end portion 334 has a width W2 taken along the first direction D1. The width W2 of the end portion 334 is less than the width W1 of the root portion 333. The latching arm body 332 is integrally connected to the end portion 334. All other parts of the elastic latching arm 33 except the root portion 333 are spaced apart from the corresponding side wall 32.

Specifically, in the present embodiment, the trapezoidal piece is an isosceles trapezoidal piece. The latching arm body 332 has a width W3 taken along the first direction D1. The width W3 of the latching arm body 332 is larger than the width W2 of the end portion 334. The latching arm body 332 has a body portion 335 which is connected to the end portion 334 and two wing portions 336 which are respectively formed to a front end and a rear end of the body portion 335. The two wing portions 336 respectively protrude relative to a front end and a rear end of the end portion 334, so that the two wing portion 336 are in a suspended state.

Referring to FIG. 2, FIG. 3, FIG. 9 and FIG. 10, the wire-end connector 102 includes an insulative housing 4, a cover body 5, a locking member 6, two strengthening ribs 7, a transmitting assembly 8 and a pull strap 9. The insulative housing 4 is made by integrally forming. The insulative housing 4 has a main body portion 41, a mating portion 42, a bearing portion 43, two side protruding blocks 44 and four outer protruding blocks 45. The main body portion 41 is rectangular frame-shaped, and is used to insert into the metal outer shell 3 of the board-end connector 101. The main body portion 41 has an end surface 411 which faces downwardly and four outer corners 412. The mating portion 42 extends downwardly from the end surface 411 of the main body portion 41, is rectangular frame-shaped, and is used to insert into the inserting groove 13 of the insulative seat 1 of the board-end connector 101. The mating portion 42 has four outer corner surfaces 421. The bearing portion 43 extends rearwardly from the main body portion 41, and is used to bear the transmitting assembly 8. The two side protruding blocks 44 are respectively provided to a left side and a right side of the main body portion 41. Each side protruding block 44 is positioned between the two corresponding outer corners 412, and is used to allow the latching arm body 332 of the corresponding elastic latching arm 33 of the board-end connector 101 to latch therewith. The four outer protruding blocks 45 protrude outwardly from the four outer corners 412 respectively. Each outer protruding block 45 has an outer corner surface 451. The outer corner surface 451 has two outer surface portions 452 which are perpendicular to each other, the two outer surface portions 452 are respectively parallel to the first direction D1 and the second direction D2. The main body portion 41 and the mating portion 42 of the insulative housing 4 together define a retaining groove 46 which is toward the front and is used to allow the locking member 6 to be received therein and a wall surface 47 which is positioned behind the retaining groove 46.

Figure 11:
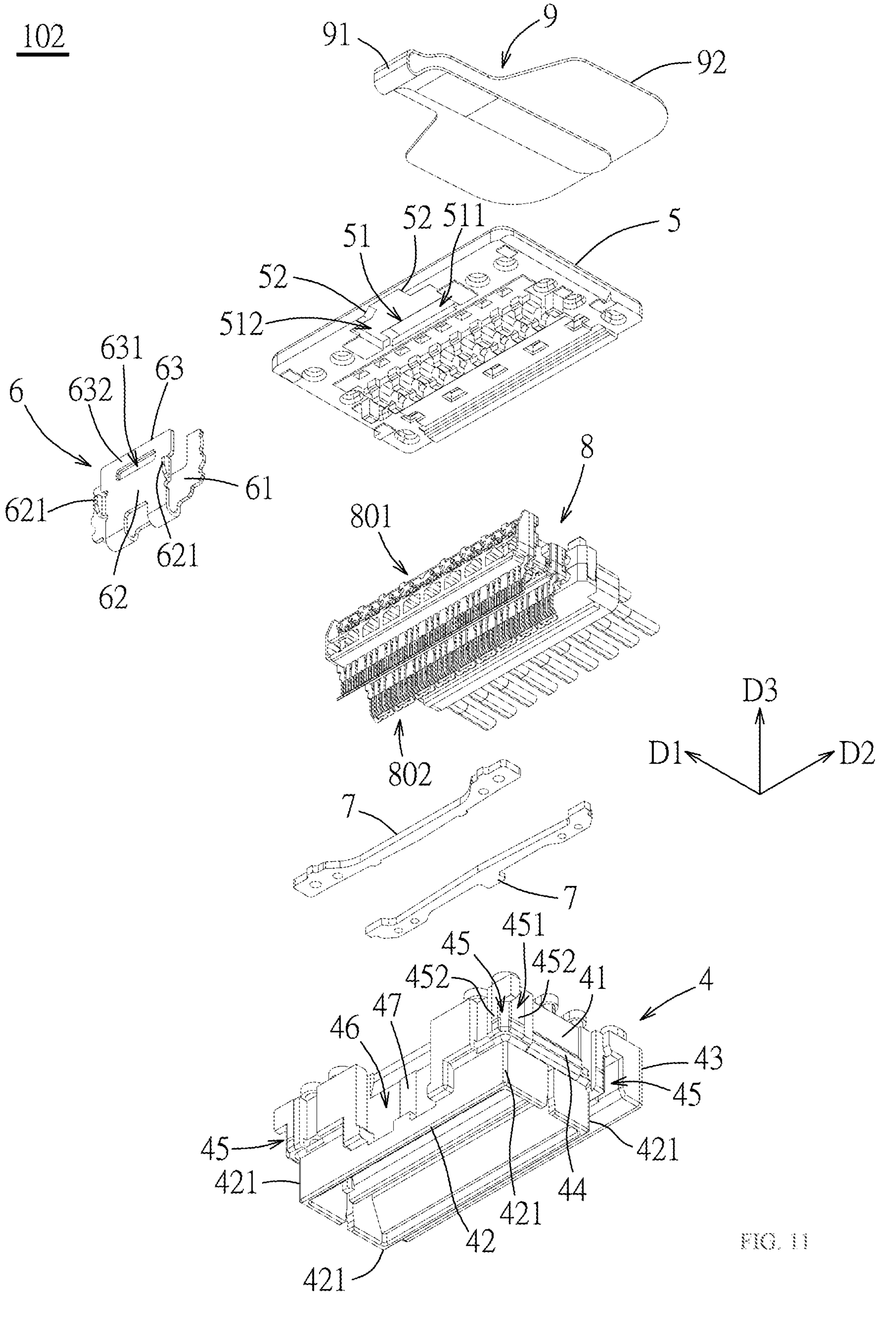
FIG. 11 is a perspective exploded view of the embodiment of the wire-end connector viewed from another angle.

Referring to FIG. 2, FIG. 3 and FIG. 11, the cover body 5 is provided to the insulative housing 4 and is fixedly engaged to a top portion of the main body portion 41 and a top portion of the bearing portion 43 by for example hot melting. The cover body 5 is made by integrally forming with for example injection molding and is formed with an aperture 51. The cover body 5 has two stopping portions 52 which are adjacent to a front end of the cover body 5 and are spaced apart from each other along the second direction D2. In the present embodiment, the aperture 51 has an aperture portion 511 and a recessed groove portion 512. The aperture portion 511 extends to a bottom surface of the cover body 5 and a top surface of the cover body 5 along the third direction D and penetrates the cover body 5. The recessed groove portion 512 is recessed upwardly from the bottom surface of the cover body 5, is communicated with a front end of the aperture portion 511 and extends to the front end of the cover body 5. The two stopping portions 52 are respectively positioned to a left side and a right side of the recessed groove portion 512 of the aperture 51, each stopping portion 52 is a stop protruding block.

Referring to FIG. 2, FIG. 11, FIG. 12 and FIG. 13, the locking member 6 has a retaining segment 61, a locking segment 62 and a connecting segment 63. The retaining segment 61 is provided in the retaining groove 46 of the insulative housing 4. A left side and a right side of the retaining segment 61 are retained to the insulative housing 4 by for example interference fit. The locking segment 62 extends upwardly from the retaining segment 61 and is spaced apart from the wall surface 47 of the insulative housing 4. The locking segment 62 is capable of bending relative to the retaining segment 61 and has two protruding portions 621 which are respectively positioned to a left side and a right side of the locking segment 62 and protrude forwardly, the two protruding portions 621 are respectively used to latch to the two latching holes 311 of the metal outer shell 3. The connecting segment 63 extends upwardly from a top portion of the locking segment 62 and is formed with a connecting hole 631. A top portion of the connecting segment 63 is received in the recessed groove portion 512 of the aperture 51 of the cover body 5 and is positioned behind the two stopping portions 52. By that the locking segment 62 is capable of bending relative to the retaining segment 61 to be away from or close to the wall surface 47, the locking member 6 is capable of switching between a locking state and a locking release state. The two stopping portions 52 of the cover body 5 are used to stop a surface 632 of the connecting segment 63 which is opposite to the wall surface 47 of the insulative housing 4 so as to prevent the connecting segment 63 from being excessively deformed.

Figure 10:
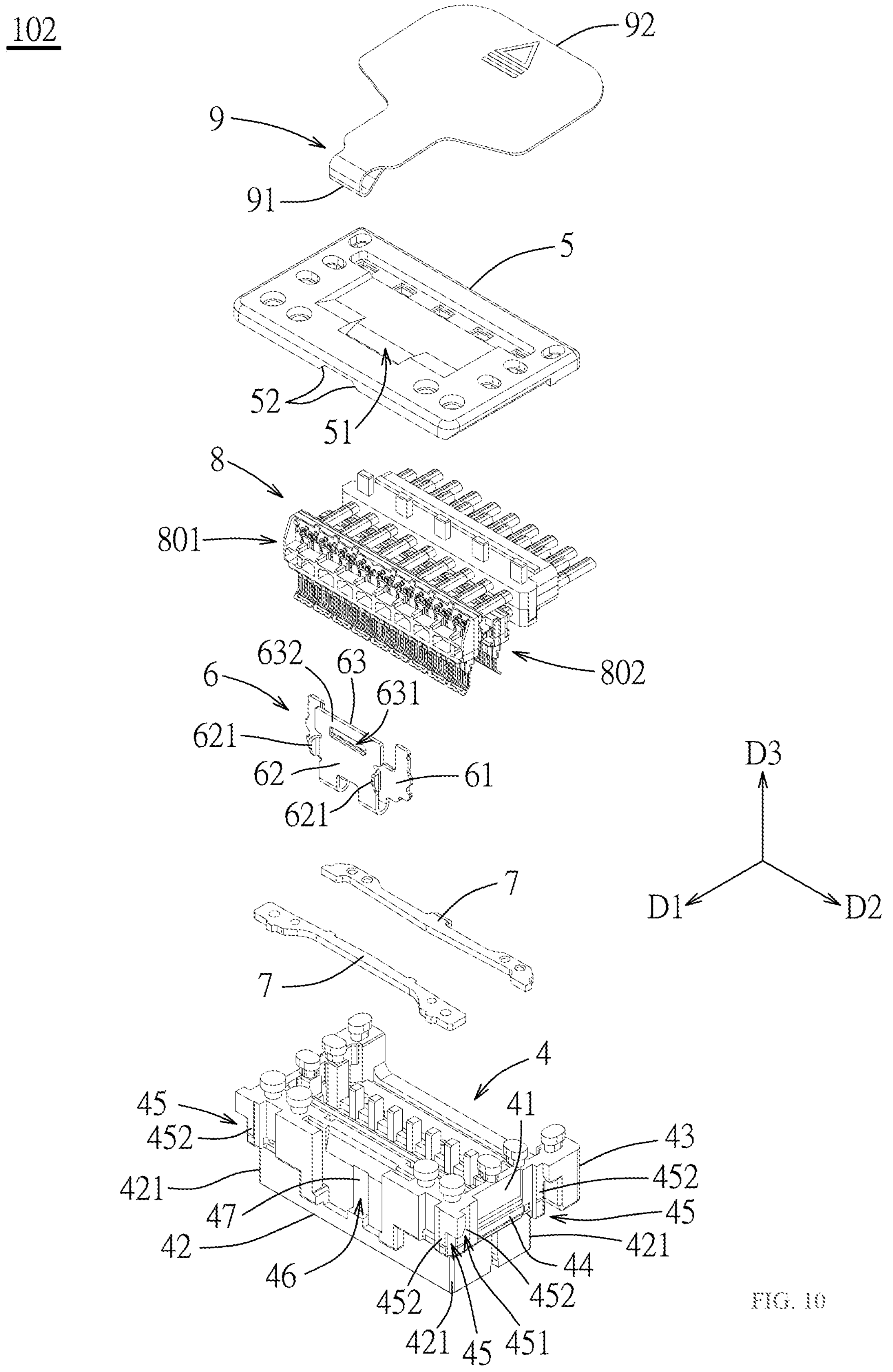
FIG. 10 is a perspective exploded view of the embodiment of the wire-end connector illustrating an assembling relationship among an insulative housing, a cover body, a locking member, two strengthening ribs, a transmitting assembly and the pull strap.
Figure 14:
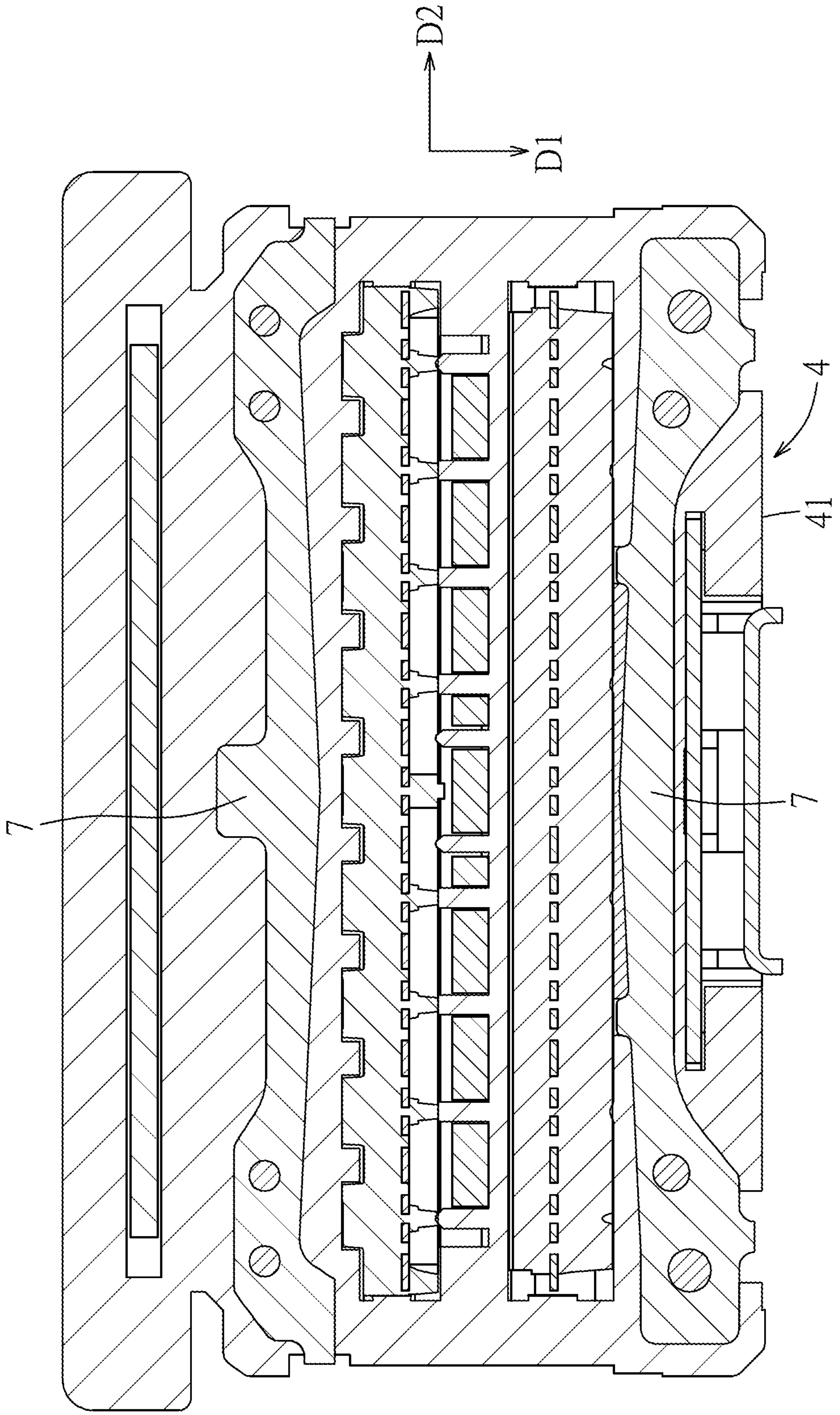
FIG. 14 is a cross sectional view taken along a line XIV-XIV of FIG. 12.

Referring to FIG. 10, FIG. 11 and FIG. 14, the two strengthening ribs 7 are made for example by a metal material. The two strengthening ribs 7 are fixedly engaged to the insulative housing 4 and are spaced apart from each other along the first direction D1. In the present embodiment, the insulative housing 4 are formed over the two strengthening ribs 7 by for example insert molding, so that the main body portion 41 is fixedly engaged with the two strengthening ribs 7. Therefore, a structure strength of the insulative housing 4 can be strengthened.

Figure 7:
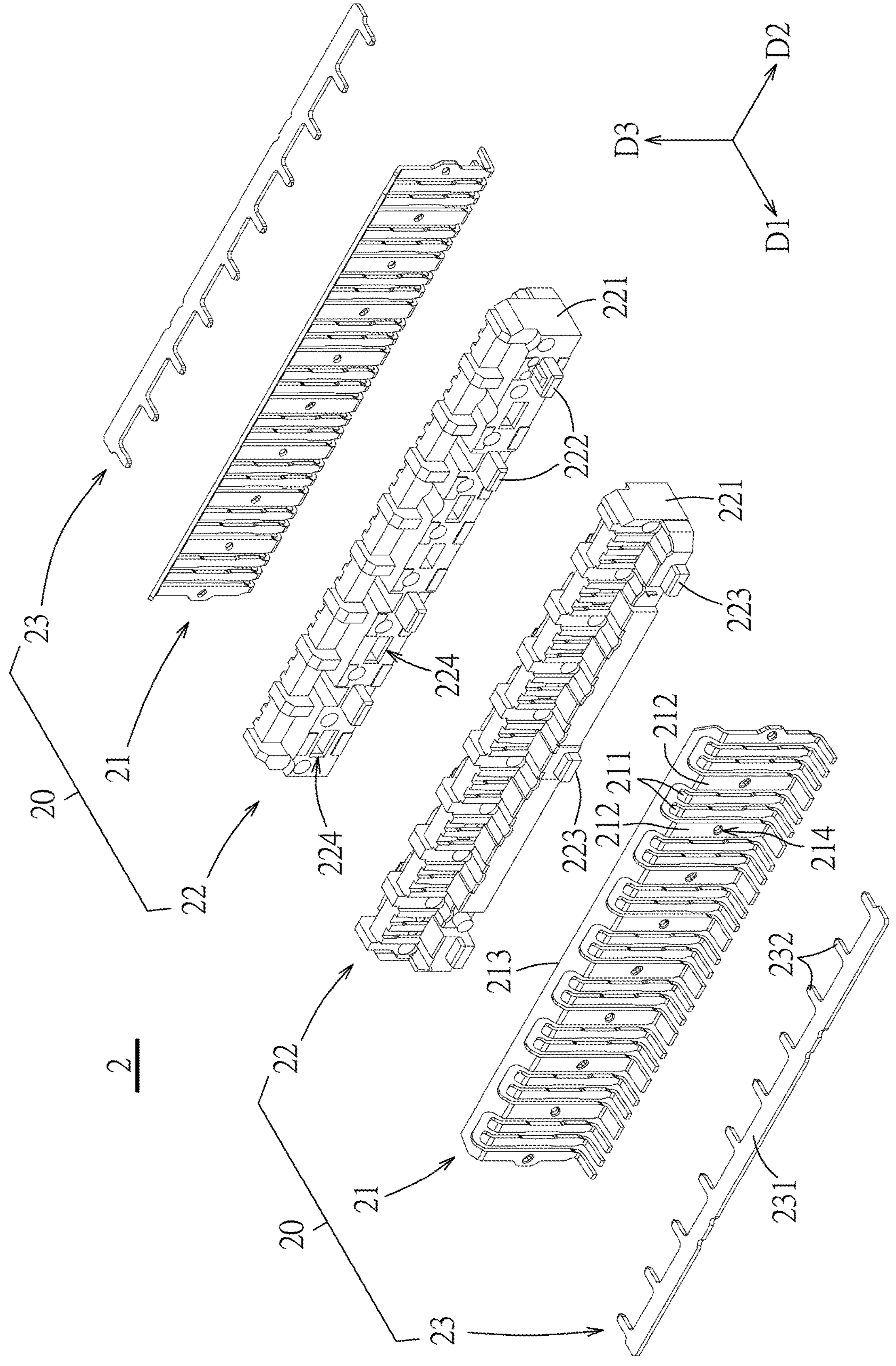
FIG. 7 is a perspective exploded view of the transmitting assembly of the board-end connector of the embodiment.

Referring to FIG. 10, FIG. 13, FIG. 15 and FIG. 16, the transmitting assembly 8 is provided in the insulative housing 4 and is engaged with the cover body 5. The transmitting assembly 8 includes a first transmitting unit 801, a second transmitting unit 802 and a bracket 803. The first transmitting unit 801 includes a first terminal wafer group 804, a plurality of first cables 805 and a first bracket 806. The first terminal wafer group 804 includes a terminal array 81, an insulative member 82 and a ground shielding member 83. The terminal array 81 has a plurality of signal terminals 811, a plurality of ground terminals 812, a ground connecting piece 813 and a plurality of ground connecting bars 814. Every two signal terminals 811 which are adjacent to each other along the second direction D2 together constitutes a terminal pair. Each signal terminal 811 is used to contact and be electrically connected to the corresponding signal terminal 211 (as shown in FIG. 7). Each signal terminal 811 is formed with a connecting hole 815 adjacent to a top end of each signal terminal 811. Every two ground terminals 812 which are adjacent to each other along the second direction D2 are respectively positioned to opposite sides of one corresponding pair of signal terminals 811. Each ground terminal 812 is used to contact and be electrically connected to the corresponding ground terminal 212 (as shown in FIG. 7). Each ground terminal 812 is formed with two ground holes 816 which are spaced apart from each other up and down. The ground connecting piece 813 is connected to top ends of the plurality of ground terminals 812 and is formed with a plurality of connecting holes 817 which are spaced apart from each other along the second direction D2, each connecting hole 817 is positioned above one corresponding pair of signal terminals 811. Each ground connecting bar 814 is positioned below one corresponding pair of signal terminals 811 and is connected to bottom ends of the two corresponding adjacent ground terminals 812

The insulative member 82 covers and supports one part of each signal terminal 811 and one part of each ground terminal 812 and exposes the other part of each signal terminal 811 and the other part of each ground terminal 812. The ground shielding member 83 has a protrusion plate 831 and a middle plate 832. The protrusion plate 831 has a plate portion 833 and a plurality of protrusion portions 834. The plate portion 833 is formed with a plurality of through holes 835 which are spaced apart from each other along the second direction D2, the plurality of through holes 835 respectively allow the plurality of first cables 805 to pass therethrough. The plurality of protrusion portions 834 are integrally connected to the plate portion 833 and extend forwardly. Each protrusion portion 834 passes through the insulative member 82 and the ground hole 816 of the corresponding ground terminal 812 and is electrically connected with the corresponding ground terminal 812. The middle plate 832 is provided between a rear end of the insulative member 82 and a front end of the plate portion 833 of the protrusion plate 831, the middle plate 832 is formed with a plurality of penetrating holes 836 and a plurality of passing holes 837. The plurality of penetrating holes 836 respectively allow the plurality of protrusion portions 834 to pass therethrough. The plurality of passing holes 837 respectively allow the plurality of first cables 805 to pass therethrough.

Each first cable 805 includes two signal conductors 8051 and a ground conductor 8052. Each signal conductor 8051 passes through the insulative member 82 and is connected to the connecting hole 815 of the corresponding signal terminal 811 and is electrically connected with the corresponding signal terminal 811. The ground conductor 8052 passes through the insulative member 82, is connected to the connecting hole 817 of the corresponding ground connecting piece 813, and is electrically connected with the corresponding ground connecting piece 813. The first bracket 806 allows the plurality of first cables 805 to pass therethrough and is used to support the plurality of first cables 805. The first bracket 806 snaps to the main body portion 41 and the bearing portion 43 of the insulative housing 4 and snaps to the cover body 5.

Referring to FIG. 10, FIG. 13, FIG. 15 and FIG. 17, a structure of the second transmitting unit 802 is similar to the structure of the first transmitting unit 801 and includes a second terminal wafer group 807, a plurality of second cables 808 and a second bracket 809. The second terminal wafer group 807 is positioned behind the first terminal wafer group 804, is positioned below the plurality of first cables 805, and supports the plurality of first cables 805. The second terminal wafer group 807 includes a terminal array 84, an insulative member 85 and a ground shielding member 86. A height of the terminal array 84 is less than a height of the terminal array 81, and the terminal array 84 and the terminal array 81 are reversely provided along the first direction D1. The terminal array 84 has a plurality of signal terminals 841, a plurality of ground terminals 842, a ground connecting piece 843 and a plurality of ground connecting bars 844. Every two signal terminals 841 which are adjacent to each other along the second direction D2 together constitutes a terminal pair. Each signal terminal 841 is used to contact and be electrically connected to the corresponding signal terminal 211 (as shown in FIG. 7). Each signal terminal 841 is formed with a connecting hole 845 adjacent to a top end of each signal terminal 841. Every two ground terminals 842 which are adjacent to each other along the second direction D2 are respectively positioned to opposite sides of one corresponding pair of signal terminals 841. Each ground terminal 842 is used to contact and be electrically connected to the corresponding ground terminal 212 (as shown in FIG. 7). Each ground terminal 842 is formed with a ground hole 846. The ground connecting piece 843 is connected to top ends of the plurality of ground terminals 842 and is formed with a plurality of connecting holes 847 which are spaced apart from each other along the second direction D2, each connecting hole 847 is positioned above one corresponding pair of the signal terminal 841. Each ground connecting bar 844 is positioned below one corresponding pair of signal terminals 841 and is connected to bottom ends of the two corresponding adjacent ground terminals 842.

The insulative member 85 covers and supports one part of each signal terminal 841 and one part of each ground terminal 842 and exposes the other part of each signal terminal 841 and the other part of each ground terminal 842. The ground shielding member 86 has a protrusion plate 861 and a middle plate 862. The protrusion plate 861 has a plate portion 863 and a plurality of protrusion portions 864. The plate portion 863 is formed with a plurality of through holes 865 which are spaced apart from each other along the second direction D2, the plurality of through holes 865 respectively allow the plurality of second cables 808 to pass therethrough. The plurality of protrusion portions 864 are integrally connected to the plate portion 863 and extend forwardly. Each protrusion portion 864 passes through the insulative member 85 and the ground hole 846 of the corresponding ground terminal 842 and is electrically connected with the corresponding ground terminal 842. The middle plate 862 is provided between a rear end of the insulative member 85 and a front end of the plate portion 863 of the protrusion plate 861, the middle plate 862 is formed with a plurality of penetrating holes 866 and a plurality of passing holes 867. The plurality of penetrating holes 866 respectively allow the plurality of protrusion portions 864 to pass therethrough. The plurality of passing holes 867 respectively allow the plurality of second cables 808 to pass therethrough.

Each second cable 808 includes two signal conductors 8081 and a ground conductor 8082. Each signal conductor 8081 passes through the insulative member 85, is connected to the connecting hole 845 of the corresponding signal terminal 841, and is electrically connected with the corresponding signal terminal 841. The ground conductor 8082 passes through the insulative member 85, is connected to the corresponding connecting hole 847 of the ground connecting piece 843, and is electrically connected with the ground connecting piece 843. The second bracket 809 allows the plurality of second cables 808 to pass therethrough and is used to support the plurality of second cables 808. The second bracket 809 snaps to the main body portion 41 and the bearing portion 43 of the insulative housing 4 and snaps to the first bracket 806.

The bracket 803 is positioned between the first terminal wafer group 804 and the second terminal wafer group 807, is positioned below the plurality of first cables 805, and is used to support the plurality of first cables 805. By that the second terminal wafer group 807 and the bracket 803 together support the plurality of first cables 805, stability of supporting can be promoted.

Figure 12:
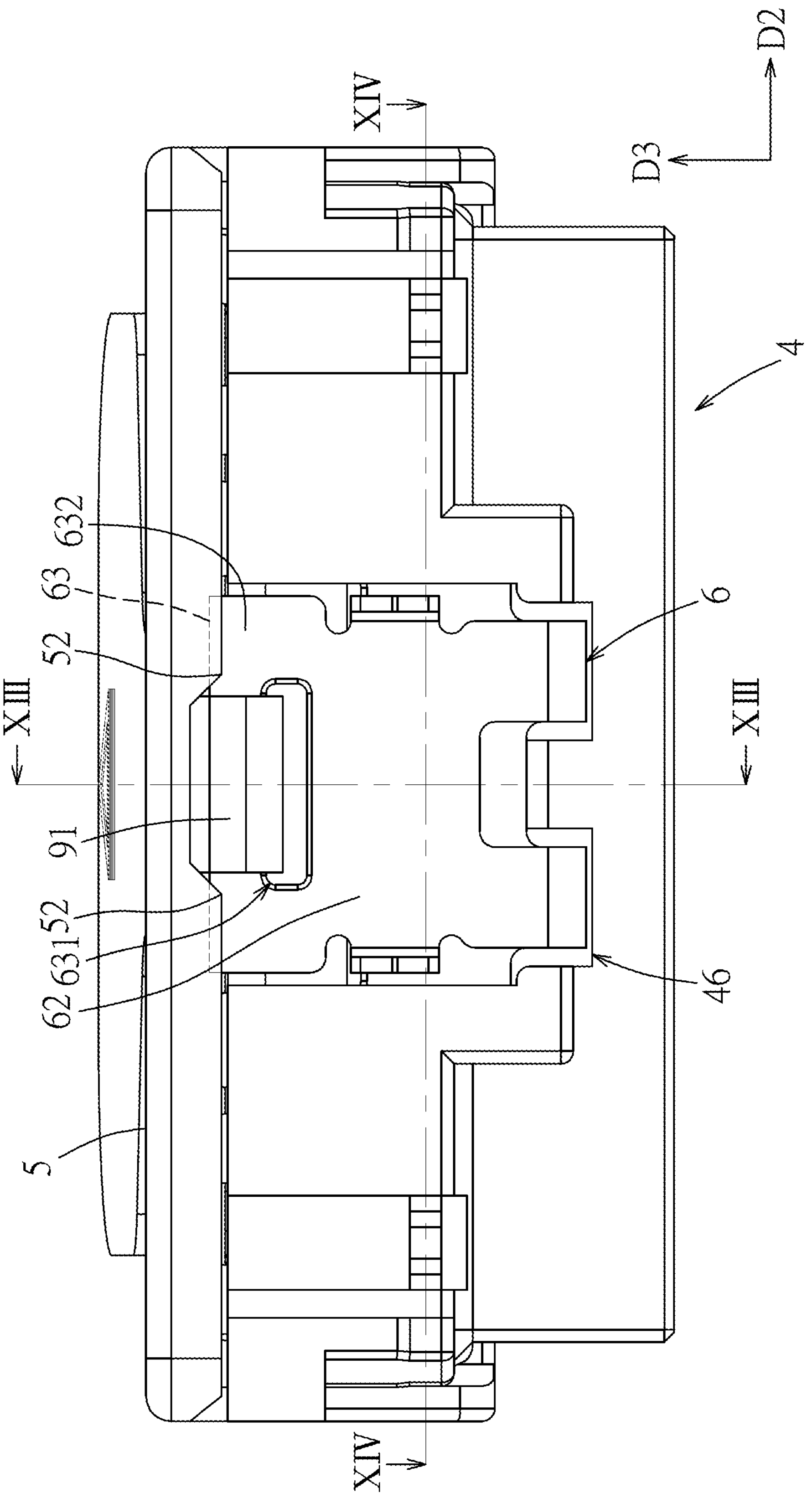
FIG. 12 is a front view of the embodiment of the wire-end connector.
Figure 13:
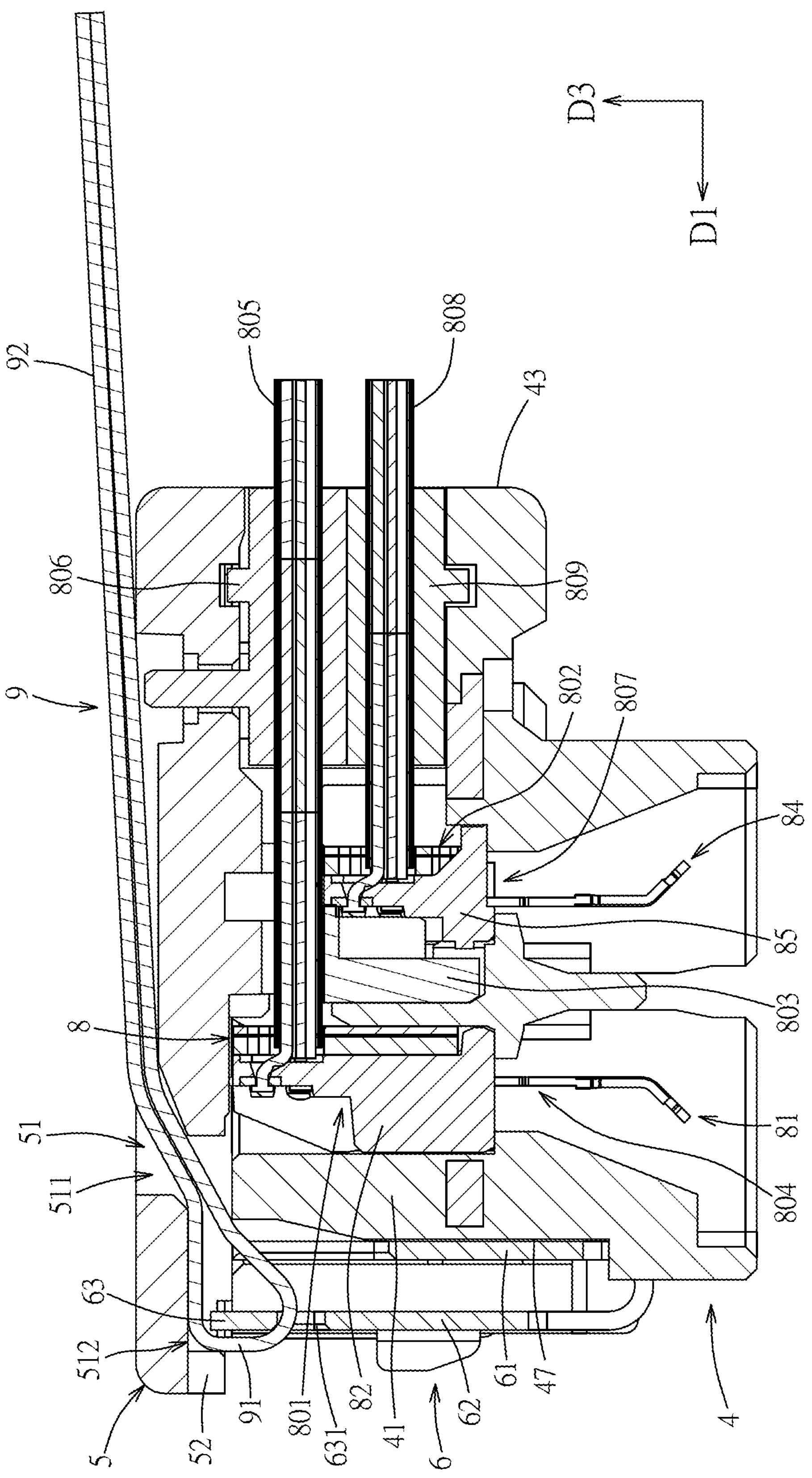
FIG. 13 is a cross sectional view taken along a line XIII-XIII of FIG. 12.

Referring to FIG. 10, FIG. 12 and FIG. 13, the pull strap 9 has a connecting strap body 91 and a grasping strap body 92. The connecting strap body 91 passes through the connecting hole 631 of the locking member 6 and is connected to the connecting segment 63. The connecting strap body 91 passes through the aperture 51 of the cover body 5 and partially extends out of a top end of the cover body 5. The grasping strap body 92 is formed to a rear end of the connecting strap body 91, and is used to allow a user to grasp and pull. When the user pulls the pull strap 9 rearwardly by means of the grasping strap body 92, the connecting strap body 91 will pull the connecting segment 63 to make the connecting segment 63 bring the locking segment 62 to bend relative to the retaining segment 61 and be close to the wall surface 47, so as to make the locking member 6 switch from the locking state to the locking release state.

Hereinafter assembling and detaching of the electrical connection device 100 will be described in detail.

Referring to FIG. 3 and FIG. 4, when the wire-end connector 102 is to be assembled to the board-end connector 101, firstly the mating portion 42 is aligned with the inserting groove 13 of the insulative seat 1. Next, the wire-end connector 102 moves downwardly along the third direction D3 and moves toward the board-end connector 101.

Figure 6:
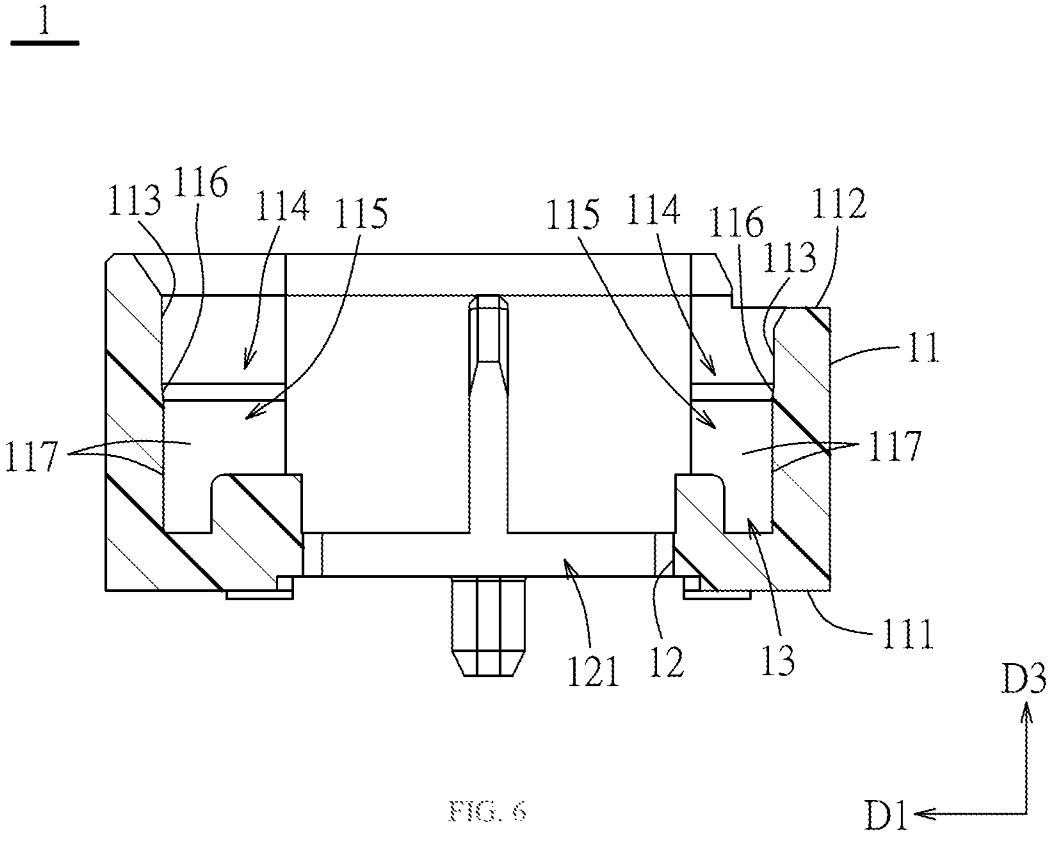
FIG. 6 is a cross sectional view taken along a line VI-VI of FIG. 5.
Figure 18:
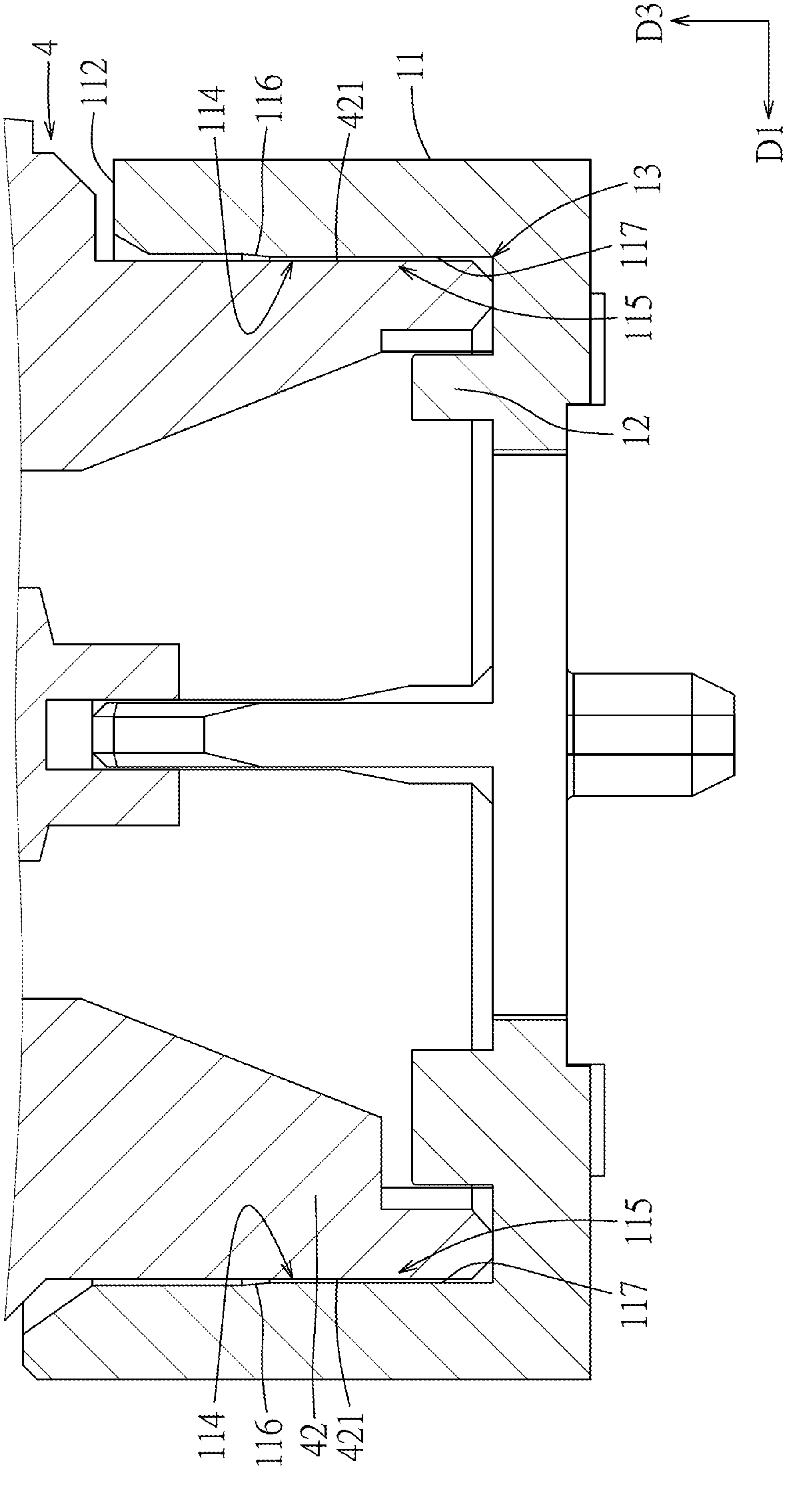
FIG. 18 is an incomplete cross sectional view of the embodiment.

Referring to FIG. 3, FIG. 6 and FIG. 18, because each inner protruding block 114 has the guiding oblique surface 116 which is used to guide insertion of the mating portion 42, in a process that the wire-end connector 102 moves downwardly, if the wire-end connector 102 has positional misalignment in the first direction D1 or the second direction D2, a bottom end of the mating portion 42 will contact the guiding oblique surface 116 of the corresponding inner protruding block 114, the mating portion 42 will slide along the guiding oblique surface 116 and a sliding direction of the mating portion 42 is guided and corrected by the guiding oblique surface 116. Therefore, positional misalignment in the process that the wire-end connector 102 moves downwardly can be absorbed, so that the mating portion 42 can precisely insert into the inserting groove 13.

By that the guiding oblique surface 116 of each inner protruding block 114 is spaced apart from the top surface 112 of the outer circumferential wall 11 along the third direction D3 by a certain distance, a height of the inner protruding block 114 in the third direction D3 is less than the height between the bottom surface 111 and the top surface 112 of the outer circumferential wall 11 in the third direction D3. Therefore, a region of friction contact between each inner protruding block 114 and the mating portion 42 can be reduced, so that smoothness of movement of the mating portion 42 can be promoted.

When each side protruding block 44 of the insulative housing 4 contacts the corresponding latching arm body 332 of the elastic latching arm 33 of the metal outer shell 3, the side protruding block 44 will apply a force to expand the latching arm body 332 outwardly, so that the elastic arm body 331 is brought by the latching arm body 332 to move around the root portion 333 relative to the corresponding side wall 32, the elastic arm body 331 is bent and deformed and accumulates an elastic restoring force. Moreover, when the two protruding portions 621 of the locking member 6 contact the corresponding end wall 31 of the metal outer shell 3, the two protruding portions 621 will be squeezed by the corresponding end wall 31, so that the locking segment 62 is bent and deformed relative to the retaining segment 61 toward a direction which is close to the wall surface 47 (as shown in FIG. 2) and accumulates an elastic restoring force.

Figure 15:
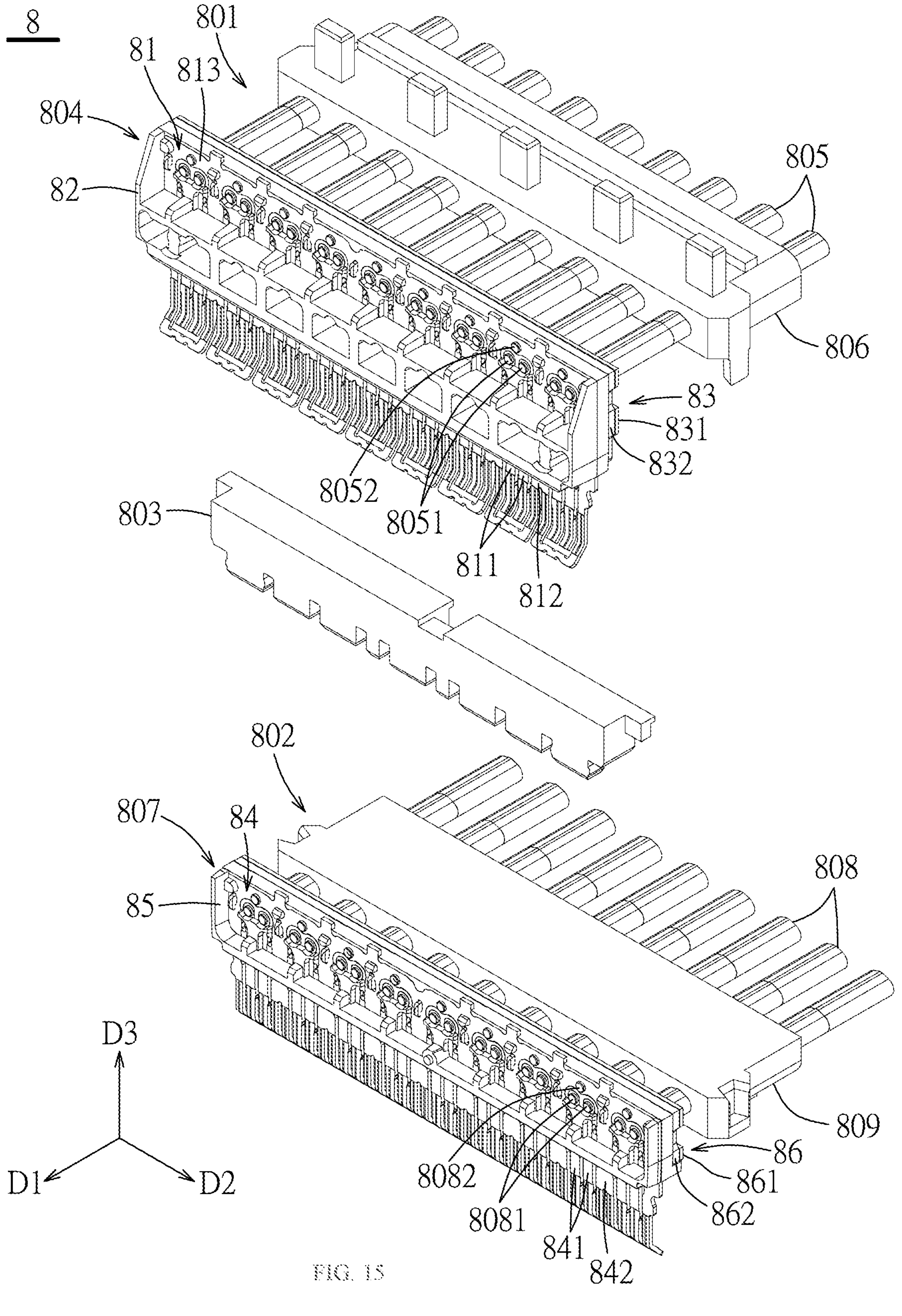
FIG. 15 is a perspective exploded view of the transmitting assembly of the wire-end connector of the embodiment illustrating an assembling relationship among a first transmitting unit, a second transmitting unit and a bracket.
Figure 16:
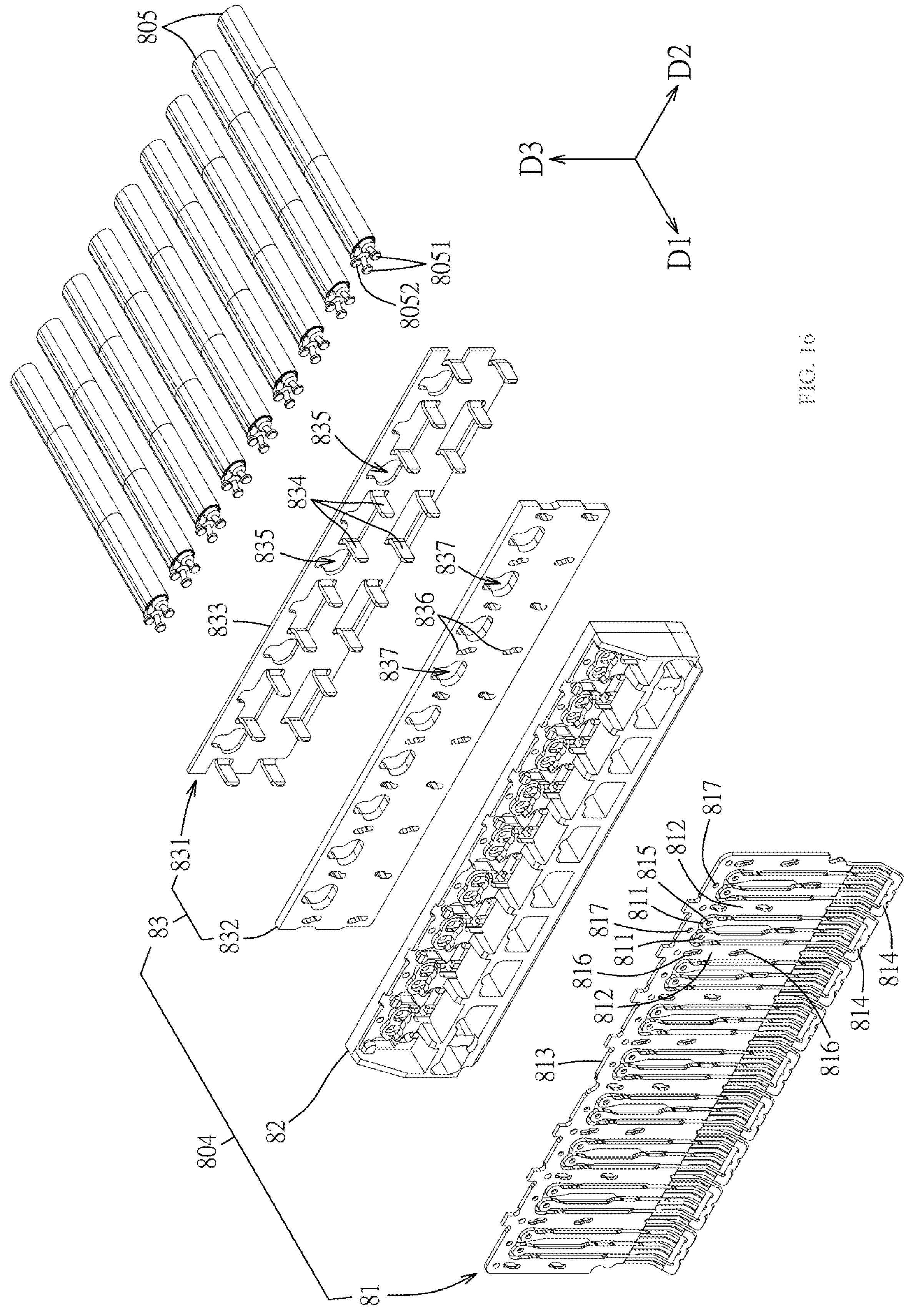
FIG. 16 is an incomplete perspective exploded view of the first transmitting unit of the wire-end connector of the embodiment illustrating an assembling relationship between a first terminal wafer group and a plurality of first cables with the first bracket omitted.
Figure 17:
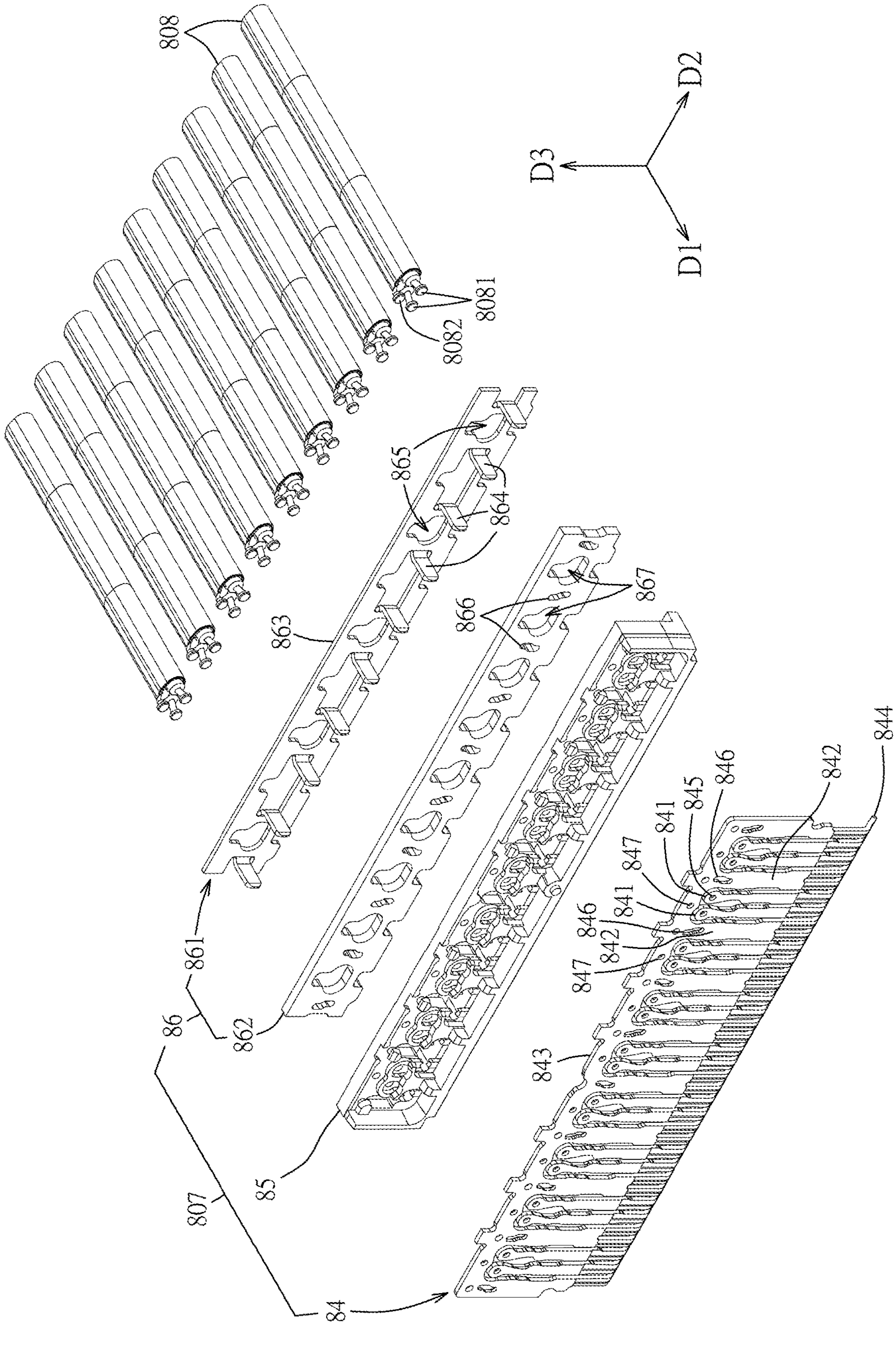
FIG. 17 is an incomplete perspective exploded view of the second transmitting unit of the wire-end connector of the embodiment illustrating an assembling relationship between a second terminal wafer group and a plurality of second cables with a second bracket omitted.

Referring to FIG. 2, FIG. 8, FIG. 18, FIG. 19 and FIG. 20, when the mating portion 42 contacts the inner circumferential wall 12 of the insulative seat 1 and is blocked by the inner circumferential wall 12 and cannot further move downwardly, the wire-end connector 102 mates with the board-end connector 101. At this time, each elastic latching arm 33 rebounds by means of the elastic restoring force accumulated by the elastic arm body 331, so that the latching arm body 332 automatically latches to a top end of the corresponding side protruding block 44. The locking segment 62 of the locking member 6 rebounds by means of the accumulated elastic restoring force, so that the locking member 6 is automatically switched to the locking state that the two protruding portions 621 respectively latch to the two latching holes 311. The signal terminals 811, 841 of the two terminal arrays 81, 84 (as shown in FIG. 15) are respectively electrically connected to the signal terminals 211 of the two terminal arrays 21 (as shown in FIG. 7), the ground terminals 812, 842*a* of the two terminal arrays 81, 84 (as shown in FIG. 15) are respectively electrically connected to the ground terminals 212 of the two terminal arrays 21 (as shown in FIG. 7). The respective parts of the four outer corner surfaces 421 of the mating portion 42 of the insulative housing 4 are respectively closely adjacent to the four inner corner surfaces 115 of the four inner protruding blocks 114 of the insulative seat 1. The main body portion 41 of the insulative housing 4 inserts into the metal outer shell 3, the four outer protruding blocks 45 are respectively closely adjacent to the four inner corner surface 34 of the metal outer shell 3.

Referring to FIG. 8, by that the width W3 of the latching arm body 332 of each elastic latching arm 33 is larger than the width W2 of the end portion 334 of the elastic arm body 331, an area that the latching arm body 332 latches and contacts the corresponding side protruding block 44 along the first direction D1 is large. Therefore, stability that the latching arm body 332 latches the side protruding block 44 can be increased. Moreover, by that the two wing portions 336 of the latching arm body 332 of each elastic latching arm 33 respectively protrude relative to the opposite ends of the end portion 334, the two wing portions 336 can respectively latch to parts of the top end of the side protruding block 44 which are respectively adjacent to a front end and a rear end of the side protruding block 44. When the plurality of first cables 805 and the plurality of second cables 808 are inadvertently touched and are pulled upwardly, the wing portion 336 which is positioned to the rear end of the side protruding block 44 can function as an effect to block the part of the side protruding block 44 adjacent to the rear end of the side protruding block 44 to move upwardly, so as to prevent a rear end of the insulative housing 4 of the wire-end connector 102 from being inclined upwardly. When the plurality of first cables 805 and the plurality of second cables 808 are inadvertently touched and are pulled downwardly, the wing portion 336 which is positioned to the front end of the side protruding block 44 can function as an effect that the part of the side protruding block 44 adjacent to the front end of the side protruding block 44 is blocked to move upwardly, so as to prevent the rear end of the insulative housing 4 from being inclined downwardly. Therefore, it can prevent the wire-end connector 102 from being inclined and shaking in a two-dimensional plane which is constituted by the first direction D1 and the third direction D3, stability of electrical signal transferring between the wire-end connector 102 and the board-end connector 101 is promoted.

Figure 19:
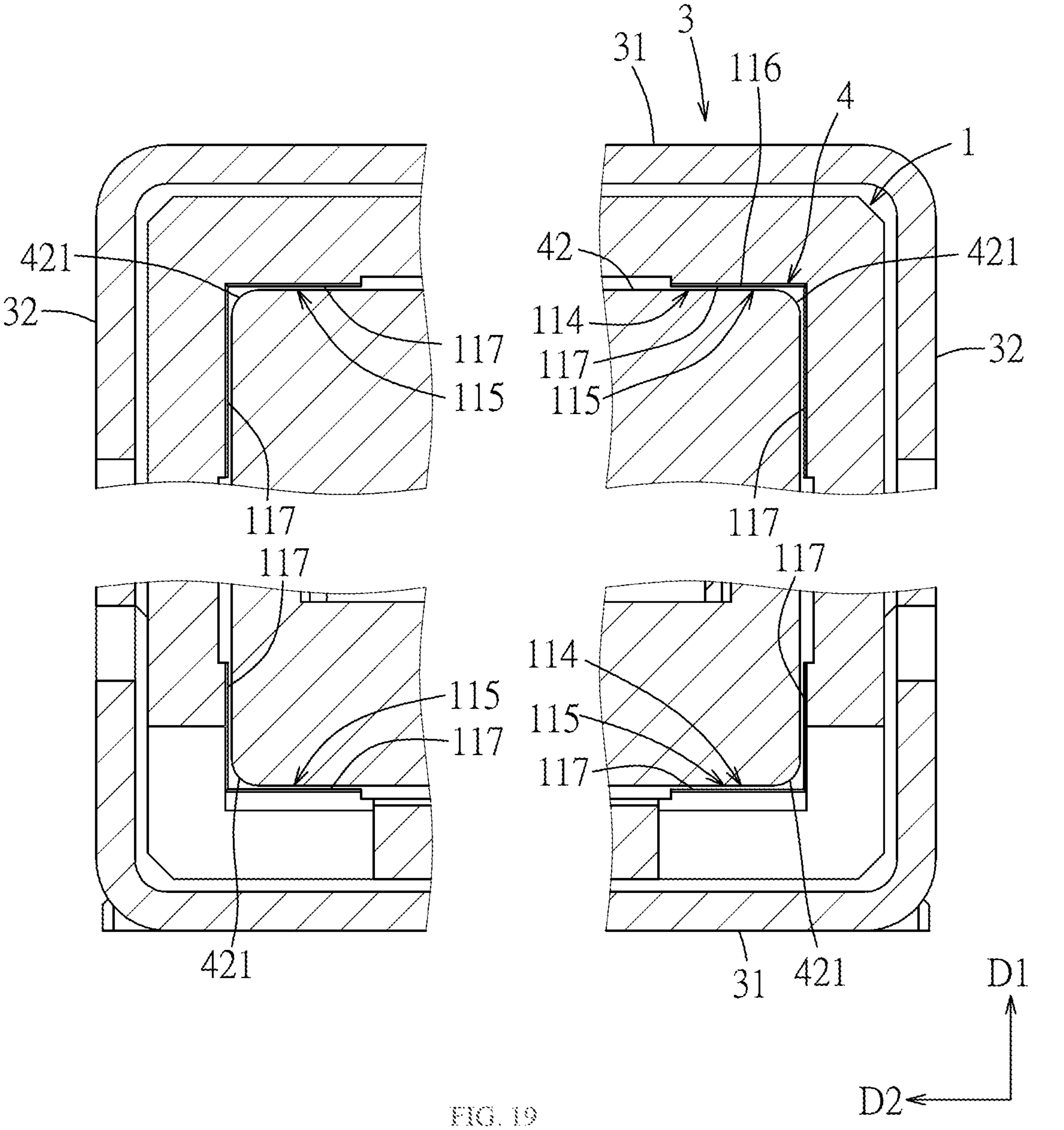
FIG. 19 is an incomplete cross sectional view of the embodiment illustrating that parts of four outer corner surfaces of the insulative housing are respectively closely adjacent to four inner corner surfaces of four inner protruding blocks of the insulative seat.
Figure 20:
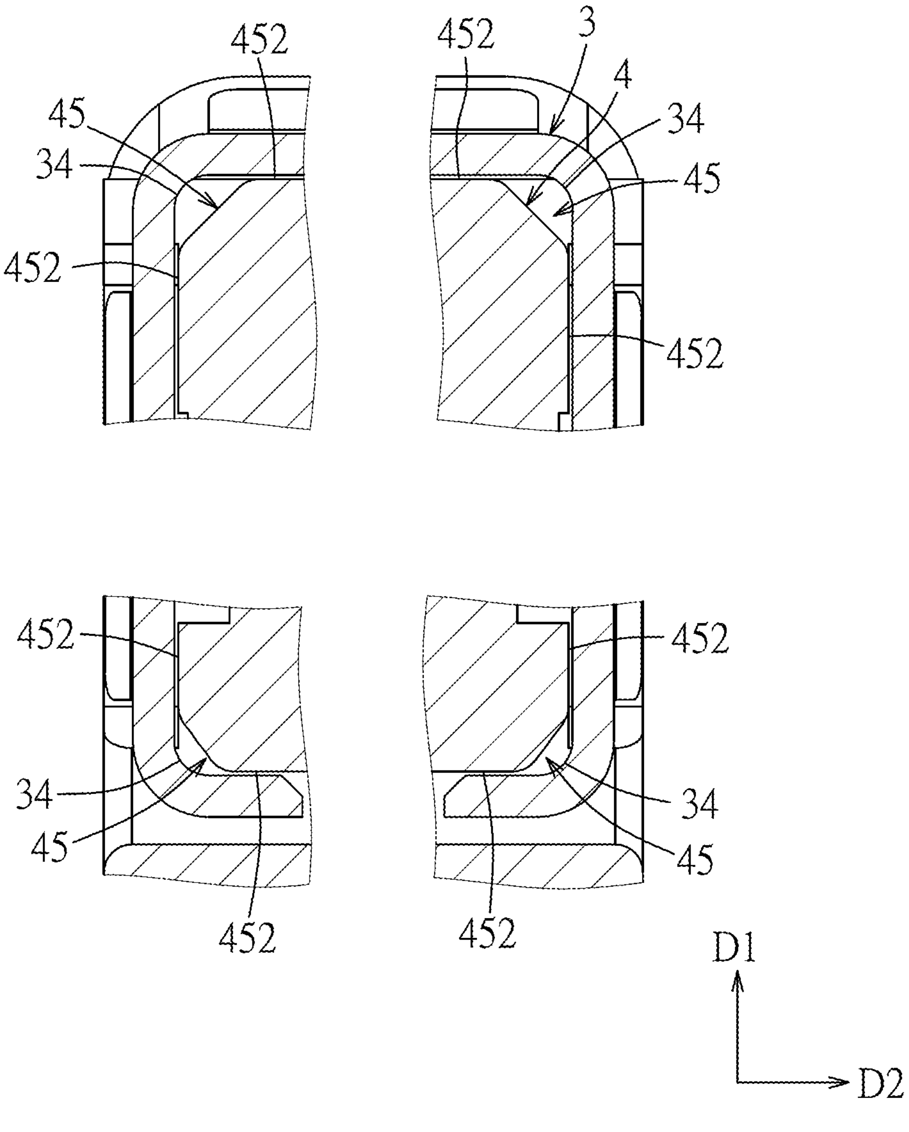
FIG. 20 is an incomplete cross sectional view of the embodiment illustrating that four outer protruding blocks of the insulative housing are respectively closely adjacent to four inner corner surfaces of the metal outer shell.

Referring to FIG. 8, FIG. 19 and FIG. 20, by that the two inner surface portions 117 of each inner protruding block 114 of the board-end connector 101 are perpendicular to each other and are respectively parallel to the first direction D1 and the second direction D2, the two inner surface portion 117 can function as an effect that the two inner surface portions 117 stop the corresponding outer corner surface 421 of the mating portion 42 respectively in the first direction D1 and the second direction D2. By that the two outer surface portions 452 of each outer protruding block 45 of the wire-end connector 102 are perpendicular to each other and are respectively parallel to the first direction D1 and the second direction D2, the two outer surface portions 452 can function as an effect that the two outer surface portions 452 are stopped to the corresponding inner corner surface 34 of the metal outer shell 3 respectively in the first direction D1 and the second direction D2. When the plurality of first cables 805 and the plurality of second cables 808 are inadvertently touched and are pulled upwardly or pulled downwardly, the four inner protruding blocks 114 and the four outer protruding blocks 45 which have a prevent inclining function can prevent the wire-end connector 102 from being inclined and shaking in the two-dimensional plane constituted by the first direction D1 and the third direction D3. When the plurality of first cables 805 and the plurality of second cables 808 are inadvertently touched and are pulled leftwardly or pulled rightwardly, the four inner protruding blocks 114 and the four outer protruding blocks 45 which have the prevent inclining function further can prevent the wire-end connector 102 from being inclined and shaking in the two-dimensional plane constituted by the first direction D1 and the second direction D2. Therefore, stability of electrical signal transferring between the wire-end connector 102 and the board-end connector 101 can be further promoted.

Referring to FIG. 2 and FIG. 3, when the wire-end connector 102 is to be detached from the board-end connector 101, the grasping strap body 92 of the pull strap 9 is pulled rearwardly, when the grasping strap body 92 is pulled rearwardly, the grasping strap body 92 will pull the connecting segment 63 via the connecting strap body 91. The connecting segment 63 will bring the locking segment 62 to bend relative to the retaining segment 61 and be close to the wall surface 47, so as to make the locking member 6 switched to the locking release state that the two protruding portions 621 are respectively separated from the two latching holes 311. Next, the grasping strap body 92 is pulled upwardly, so that the pull strap 9 brings the wire-end connector 102 to move upwardly. In a process that the wire-end connector 102 moves upwardly, each side protruding block 44 will apply a force to expand the corresponding latching arm body 332 outwardly, so that the elastic arm body 331 is brought by the latching arm body 332 to be bent and deformed around the root portion 333 relative to the corresponding side wall 32 and accumulates an elastic restoring force. When each side protruding block 44 passes over the corresponding latching arm body 332, each elastic latching arm 33 rebounds and restores by mean of the elastic restoring force accumulated by the elastic arm body 331. Subsequently, the wire-end connector 102 can be detached from the board-end connector 101. After the wire-end connector 102 is detached from the board-end connector 101, the grasping strap body 92 of the pull strap 9 is released, in addition to that the locking segment 62 rebounds and restores by means of the elastic restoring force accumulated by itself, the locking segment 62 rebounds and restores further by means of a tension applied by the connecting strap body 91.

By a design of each chamfer 312 of the end wall 31 which is positioned to the front end of the metal outer shell 3, in addition to that a gap between the end wall 31 and a top end of the corresponding protruding portion 621 is maintained as a small interval, it further can avoid the protruding portion 621 hitting the end wall 31 or generating friction with the end wall 31 in the process that the pull strap 9 pulls the connecting segment 63 to bring the protruding portion 621 to rotate. Therefore, smoothness of switching of the locking member 6 from the locking state to the locking release state can be promoted, the two protruding portions 621 can be conveniently and rapidly separated from the two latching holes 311 respectively.

Referring to FIG. 2 and FIG. 12, by that the two stopping portions 52 of the cover body 5 respectively stop two parts of the surface 632 of the connecting segment 63 which are positioned to opposite sides of the connecting hole 631, the two stopping portions 52 can function as an effect that the two stopping portions 52 stop the surface 632 in balance left and right. Therefore, whether the locking segment 62 rebounds and restores by means of the elastic restoring force accumulated by itself or the locking segment 62 rebounds and restores by means of the elastic restoring force accumulated by itself and the tension applied by the connecting strap body 91, the two stopping portions 52 can both stop the surface 632 in balance left and right and limit the deformation extent of the connecting segment 63, so that excessive deformation of the connecting segment 63 can be prevented.

By that the recessed groove portion 512 of the aperture 51 is recessed upwardly from the bottom surface of the cover body 5 and partitions the cover body 5 into the two stopping portions 52, an entire thickness of the cover body 5 can be designed to be thinner. The recessed groove portion 512 provides a manner for receiving the top portion of the connecting segment 63 and a part of the connecting strap body 91 of the pull strap 9, so the structure of the wire-end connector 102 is compact, and an entire thickness of the wire-end connector 102 and the board-end connector 101 of the electrical connection device 100 in the third direction D3 can be lowered after assembled.

Because the cover body 5 is simple in structure thereof, is easily manufactured, manufacturing time is short, and the cost is low, by the manner that the two stopping portions 52 are formed to the cover body 5, manufacturing convenience can be promoted and manufacturing cost can be lowered. Moreover, because the insulative housing 4 does not need to form the structure which is used to stop the connecting segment 63 of the locking member 6, entire structure complexity of the insulative housing 4, manufacturing difficulty and manufacturing cost can be lowered.

Referring to FIG. 3 and FIG. 8, because the area that the latching arm body 332 of each elastic latching arm 33 latches and contacts the corresponding side protruding block 44 along the first direction D1 is large, a pressure of the latching arm body 332 acting to the corresponding side protruding block 44 in the assembling or detaching process can be dispersed, so as to reduce wearing of the insulative housing 4. Moreover, by a design manner that the elastic arm body 331 of each elastic latching arm 33 is an isosceles trapezoidal piece, when the latching arm body 332 is pushed by the corresponding side protruding block 44 to bring the elastic arm body 331 to be bent and deformed, two legs of the isosceles trapezoid of the elastic arm body 331 can uniformly disperse a part of stress when the elastic arm body 331 is deformed, so as to avoid stress concentrating on a front end and a rear end of the root portion 333. Therefore, the elastic latching arm 33 is not prone to be permanently deformed and working life can be promoted.

Referring to FIG. 2 and FIG. 15, by the manner of the structures of the transmitting assemblies 2, 8 and electrical connection therebetween, the electrical connection device 100 can meet high data rate transferring requirement.

It is noted that, the present embodiment also has the following different implementing manners as required.

One of the implementing manners is that, the stopping portion 52 of the cover body 5 is one in number.

Another implementing manner is that, the aperture 511 of the cover body 5 only has the aperture portion 511 and omits the recessed groove portion 512. The two stopping portions 52 protrude downwardly from the bottom surface of the cover body 5.

Still another implementing manner is that, the elastic arm body 331 of each elastic latching arm 33 is a non-isosceles trapezoidal piece.

Yet another implementing manner is that, the latching arm body 332 of each elastic latching arm 33 only has one wing portion 336 which protrudes relative to one end of the end portion 334.

Further implementing manner is that, the latching hole 311 of the metal outer shell 3 is one in number, and the protruding portion 621 of the locking segment 62 of the locking member 6 is one in number.

Still implementing manner is that, the terminal wafer module 20 of the board-end connector 101 is one in number, and the transmitting unit of the wire-end connector 102 is one in number.

In conclusion, by that the stopping portion 52 of the cover body 5 stops the connecting segment 63, the electrical connection device 100 of the present embodiment can prevent excessive deformation of the connecting segment 63. Because the cover body 5 is simple in structure thereof, is easily manufactured, manufacturing time is short, and the cost is low, by the manner that the stopping portion 52 is formed to the cover body 5, manufacturing convenience can be promoted and manufacturing cost can be lowered. By a design of the chamfer 312 of the metal outer shell 3, it can avoid the protruding portion 621 hitting the end wall 31 or generating friction with the end wall 31 in the process that the protruding portion 621 rotates, the protruding portion 621 can be rapidly separated from the latching hole 311. By that the width W3 of the latching arm body 332 of each elastic latching arm 33 is larger than the width W2 of the end portion 334 of the elastic arm body 331, an area that the latching arm body 332 latches and contacts corresponding the side protruding block 44 is large. Therefore, stability that the latching arm body 332 latches the side protruding block 44 can be increased, furthermore, a pressure of the latching arm body 332 acting to the corresponding side protruding block 44 in the assembling or detaching process can be dispersed, so as to reduce wearing of the insulative housing 4. By that the two wing portions 336 of the latching arm body 332 of each elastic latching arm 33 respectively latch to parts of the top end of the side protruding block 44 which are respectively adjacent to a front end and a rear end of the side protruding block 44, it can prevent the wire-end connector 102 from being inclined and shaking in a two-dimensional plane which is constituted by the first direction D1 and the third direction D3. By a design manner that the elastic arm body 331 of each elastic latching arm 33 is an isosceles trapezoidal piece, the elastic latching arm 33 is not prone to be permanently deformed and working life can be promoted. By a design the four inner protruding blocks 114 and the four outer protruding blocks 45, it can prevent the wire-end connector 102 from being inclined and shaking in the two-dimensional plane constituted by the first direction D1 and the third direction D3, and it can prevent the wire-end connector 102 from being inclined and shaking in the two-dimensional plane constituted by the first direction D1 and the second direction D2. Therefore, the object of the present disclosure can be indeed attained.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An electrical connection device, comprising:
a wire-end connector, comprising:
  an insulative housing formed with a retaining groove;
  a plurality of terminals provided within the insulative housing;
  a plurality of cables electrically connected to the plurality of the terminals;
  a locking member having a retaining segment positioned in the retaining groove, a locking segment extending upward from a bend in the retaining segment, and a connecting segment extending from the locking segment, the connecting segment comprising a connecting hole, the locking segment comprising a protruding portion configured to latch to a latching hole, and the locking segment being bendable relative to the retaining segment;
  a cover body coupled to the insulative housing, the cover body comprising a recessed groove portion and a stopping portion for stopping a surface of the connecting segment of the locking member opposite to the insulative housing; and
  a pull strap having a connecting strap body which passes through the connecting hole and is connected to the connecting segment, wherein the connecting segment is received in the recessed groove portion and is retained by the stopping portion.

2. The electrical connection device of claim 1, wherein: the cover body further comprises an aperture, and the connecting strap body of the pull strap passes through the aperture and is connected to the connecting segment, and a grasping strap body.

3. The electrical connection device of claim 2, wherein:
the aperture has an aperture portion and the recessed groove portion,
the aperture portion penetrates the cover body and allows the connecting strap body to pass therethrough, and
the recessed groove portion is recessed upwardly from a bottom surface of the cover body and is communicated with the aperture portion, the recessed groove portion allows a top portion of the connecting segment and a part of the connecting strap body to be received therein.

4. The electrical connection device of claim 1, wherein the stopping portion comprises a stop protruding block.

5. The electrical connection device of claim 1, wherein the stopping portion is one of two stopping portions, and the cover body has the two stopping portions which are spaced apart from each other and stop the surface of the connecting segment.

6. The electrical connection device of claim 1, wherein:
the electrical connection device further comprises a board-end connector which is used to mate with the wire-end connector,
the board-end connector comprises an insulative seat, a plurality of terminals which are provided to the insulative seat, and a metal outer shell which sheathes the insulative seat, and
the metal outer shell comprises a latching hole which is used to allow the protruding portion to latch therewith, and an inner side of the metal outer shell has a chamfer which is closely adjacent to a top portion of the latching hole and is toward the protruding portion.

7. The electrical connection device of claim 1, wherein: the insulative housing has two side protruding blocks which are respectively positioned on opposite sides of the insulative housing, the electrical connection device further comprises a board-end connector which is used to mate with the wire-end connector, the board-end connector comprises an insulative seat, a plurality of terminals which are provided to the insulative seat and a metal outer shell which sheathes the insulative seat, and the metal outer shell has two elastic latching arms which are respectively used to latch to the two side protruding blocks.

8. The electrical connection device of claim 7, wherein: each elastic latching arm has an elastic arm body and a latching arm body, the elastic arm body is a trapezoidal piece and has a root portion and an end portion opposite to the root portion, the end portion and the root portion are parallel to each other, a width of the end portion is less than a width of the root portion, and the latching arm body is connected to the end portion and is used to latch to the corresponding side protruding block.

9. The electrical connection device of claim 8, wherein the trapezoidal piece is an isosceles trapezoidal piece.

10. The electrical connection device of claim 8, wherein a width of the latching arm body is larger than the width of the end portion.

11. The electrical connection device of claim 10, wherein the latching arm body has a body portion which is connected to the end portion and two wing portions which are respectively formed to opposite ends of the body portion, the two wing portions respectively protrude relative to opposite ends of the end portion.

12. The electrical connection device of claim 7, wherein: each elastic latching arm has an elastic arm body and a latching arm body, the elastic arm body has an end portion, the latching arm body is connected to the end portion and is used to latch to the corresponding side protruding block, a width of the latching arm body is larger than a width of the end portion, and the latching arm body has two wing portions which respectively protrude relative to opposite ends of the end portion.

13. The electrical connection device of claim 1, wherein: the insulative housing has a main body portion and four outer protruding blocks, the main body portion is rectangular frame-shaped and has four outer corners, and the four outer protruding blocks respectively protrude outwardly from the four outer corners, the electrical connection device further comprises a board-end connector which is used to mate with the wire-end connector, the board-end connector comprises an insulative seat, a plurality of terminals which are provided to the insulative seat and a metal outer shell which sheathes the insulative seat, the metal outer shell is rectangular frame-shaped and is used to allow the main body portion to insert therein, the metal outer shell has four inner corner surfaces, and the four outer protruding blocks are respectively adjacent to the four inner corner surfaces.

14. The electrical connection device of claim 13, wherein each outer protruding block has an outer corner surface, the outer corner surface has two outer surface portions which are perpendicular to each other.

15. The electrical connection device of claim 1, wherein the electrical connection device further comprises a board-end connector which is used to mate with the wire-end connector, the board-end connector comprises an insulative seat, a plurality of terminals which are provided to the insulative seat and a metal outer shell which sheathes the insulative seat, the insulative seat is rectangular frame-shaped and has four inner corners and four inner protruding blocks which respectively protrude inwardly from the four inner corners, the insulative housing has a main body portion and a mating portion, the main body portion has an end surface, the mating portion extends from the end surface, is rectangular frame-shaped, and is used to insert into the insulative seat, and the mating portion has four outer corner surfaces, each outer corner surface at least has a part which is used to be closely adjacent to the corresponding inner protruding block.

16. The electrical connection device of claim 15, wherein each inner protruding block has a guiding oblique surface which is used to guide insertion of the mating portion and an inner corner surface which is used to be closely adjacent to the corresponding outer corner surface.

17. The electrical connection device of claim 16, wherein the inner corner surface has two inner surface portions which are perpendicular to each other.

18. The electrical connection device of claim 16, wherein: the insulative seat further has an outer circumferential wall and an inner circumferential wall which is formed to an inner wall surface of the outer circumferential wall and is used to stop the wire-end connector, the outer circumferential wall has the four inner corners, the four inner protruding blocks and a top surface, and the inner corner surface is connected to the inner circumferential wall, the guiding oblique surface is spaced apart from the top surface by a certain distance.

19. The electrical connection device of claim 1, wherein the wire-end connector further comprises two strengthening ribs which are fixedly engaged to the insulative housing and are spaced apart from each other.

20. The electrical connection device of claim 1, wherein: the wire-end connector further comprises at least one terminal wafer group, the terminal wafer group comprises a terminal array, an insulative member and a ground shielding member, the terminal array has the plurality of terminals, the plurality of terminals are divided into signal terminals and ground terminals, the insulative member covers and supports one part of each signal terminal and one part of each ground terminal of the terminal wafer group and exposes the other part of each signal terminal and the other part of each ground terminal of the terminal wafer group, the ground shielding member is provided to an end of the insulative member and comprises protrusion portions, each protrusion portion passes through the insulative member and is electrically connected to the corresponding ground terminal, the electrical connection device further comprises a board-end connector which is used to mate with the wire-end connector, the board-end connector comprises at least one terminal wafer module, the terminal wafer module comprises a terminal array, an insulative member and a ground piece, the terminal array of the terminal wafer module is used to be electrically connected to the terminal array of the terminal wafer group and has signal terminals and ground terminals, the insulative member of the terminal wafer module covers and supports one part of each signal terminal and one part of each ground terminal of the terminal wafer module and exposes the other part of each signal terminal and the other part of each ground terminal of the terminal wafer module, and the ground piece has protruding piece portions which are electrically connected to the ground terminals of the terminal wafer module, respectively.

21. The electrical connection device of claim 20, wherein:

each ground terminal of the terminal wafer group is formed with a ground hole, the ground shielding member comprises a protrusion plate which has the protrusion portions and a middle plate, the protrusion plate has a plate portion, the protrusion portions are integrally connected to the plate portion, the middle plate is provided between the insulative member of the terminal wafer group and the plate portion of the protrusion plate and is formed with penetrating holes, and each protrusion portion passes through the corresponding ground hole and the corresponding penetrating hole.

22. The electrical connection device of claim 20, wherein:

each ground terminal of the terminal wafer module is formed with a ground hole, the ground piece further has a main piece portion which is provided to the insulative member of the terminal wafer module, and the protruding piece portions protrude from an end of the main piece portion, each protruding piece portion passes through the ground hole of the corresponding ground terminal of the terminal wafer module.

23. The electrical connection device of claim 20, wherein:

the wire-end connector comprises two terminal wafer groups, and the board-end connector comprises two terminal wafer modules, the terminal array of each terminal wafer module is used to be electrically connected to the terminal array of the corresponding terminal wafer group.

24. The electrical connection device of claim 1, wherein:

the plurality of cables are divided into a plurality of first cables and a plurality of second cables, the wire-end connector further comprises a first transmitting unit, a second transmitting unit and a bracket, the first transmitting unit comprises a first terminal wafer group and the plurality of first cables which are connected to the first terminal wafer group, the second transmitting unit comprises a second terminal wafer group and the plurality of second cables which are connected to the second terminal wafer group, the second terminal wafer group is positioned behind the first terminal wafer group, is positioned below the plurality of first cables, and supports the plurality of first cables, and the bracket is positioned between the first terminal wafer group and the second terminal wafer group, is positioned below the plurality of the first cables, and supports the plurality of the first cables.

25. An electrical connection device, comprising:

a wire-end connector, comprising:

an insulative housing comprising a retaining groove;

a plurality of terminals disposed within the insulative housing;

a plurality of cables electrically connected to the plurality of terminals;

a locking member comprising:

a retaining segment positioned within the retaining groove;

a locking segment extending upward from a bend in the retaining segment, the locking segment being bendable relative to the retaining segment and comprising at least one protruding portion; and a connecting segment extending from the locking segment; and a cover body coupled to the insulative housing, the cover body comprising a recessed groove portion and at least one stopping portion configured to stop a surface of the connecting segment opposite the insulative housing; and a board-end connector matable with the wire-end connector, the board-end connector comprising:

an insulative seat;

a plurality of terminals disposed within the insulative seat; and an outer shell surrounding the insulative seat, wherein the outer shell comprises at least one latching hole configured to receive the at least one protruding portion of the locking segment to releasably retain the wire-end connector to the board-end connector, and wherein movement of the connecting segment bends the locking segment relative to the retaining segment to disengage the at least one protruding portion from the at least one latching hole.

* * * * *